(12) United States Patent  
Bishop et al.

(10) Patent No.: US 9,031,993 B2  
(45) Date of Patent: May 12, 2015

(54) CUSTOMIZABLE LIBRARY FOR INFORMATION TECHNOLOGY DESIGN AND MANAGEMENT USING EXPERT KNOWLEDGE BASE

(75) Inventors: Anthony Bennett Bishop, Charlotte, NC (US); Sheppard David Narkier, Charlotte, NC (US); Alexis Salvatore Pecoraro, Huntersville, NC (US); Paul John Wanish, Concord, NC (US)

(73) Assignee: EMC Corporation, Hopkinton, MA (US)

( * ) Notice: Subject to any disclaimer, the term of this patent is extended or adjusted under 35 U.S.C. 154(b) by 92 days.

(21) Appl. No.: 12/899,315

(22) Filed: Oct. 6, 2010

(65) Prior Publication Data

US 2011/0087704 A1 Apr. 14, 2011

Related U.S. Application Data

(60) Provisional application No. 61/278,360, filed on Oct. 6, 2009.

(51) Int. Cl.
*G06F 17/30* (2006.01)
(52) U.S. Cl.
CPC .... *G06F 17/30864* (2013.01); *G06F 17/30011* (2013.01); *G06F 17/30893* (2013.01)
(58) Field of Classification Search
CPC ....................................................... G06F 17/30
USPC ......................................................... 707/797
See application file for complete search history.

(56) References Cited

U.S. PATENT DOCUMENTS

| 7,162,427 | B1 | 1/2007 | Myrick et al. |
| 2002/0087497 | A1* | 7/2002 | Troianova et al. ............... 706/45 |
| 2006/0242261 | A1 | 10/2006 | Piot et al. |
| 2007/0033221 | A1* | 2/2007 | Copperman et al. ...... 707/103 R |
| 2007/0157165 | A1 | 7/2007 | Kim |
| 2008/0040364 | A1 | 2/2008 | Li |
| 2011/0145657 | A1 | 6/2011 | Bishop et al. |

OTHER PUBLICATIONS

Information Disclosure Statement (IDS) Letter Regarding Common Patent Application(s), dated Mar. 21, 2012.

* cited by examiner

*Primary Examiner* — Syling Yen
*Assistant Examiner* — Johnese Johnson
(74) *Attorney, Agent, or Firm* — Krishnendu Gupta; Joseph D'Angelo

(57) ABSTRACT

A system for providing a customized library platform of informational elements, each pertaining to one or more of information technology disciplines, includes a database of informational elements, and first computer-implemented user interfaces usable to provide the customization and a second user interface usable to view the customized library platform. The IT disciplines span design, analysis, modeling and management across a wide spectrum of IT functions and includes levels of detail and viewpoints that accommodate multiple roles across IT, from very senior executives to low level engineers and programmers. The knowledge base allows organizations to model their knowledge relationships to fit their structures, processes and guidelines, by using a provided framework as a starting point. The intelligent knowledge base emphasizes specific practices that enhance the linkage of business to IT, which is a widely recognized gap across IT creating massive waste and inefficiency.

20 Claims, 26 Drawing Sheets

FIG. 10

Tools
Overview
Advanced View

Quick Search [ ] Go

TRANSFORMATION TOOLS

Industry Verticals: Drive business to IT alignment in specific industry verticals through patterns.

Accelerators: Operational enablers and disciplines needed to establish IT transformation.

Optimizer: Address specific business and IT pain points and better leverage IT infrastructure.

TRANSFORMATION PROGRAMS

Business Platform: A suite of enablers to rationalize current application collections into a portfolio of business services.

Enterprise Cloud Delivery: A suite of capabilities to bridge the gap from legacy delivery to an Enterprise Cloud delivery model.

Datacenter Infrastructure: A suite of capabilities to transform siloed platforms into demand driven tailored operational footprints.

TRANSFORMATION ENABLERS

Align: Guidance for transitioning legacy IT to align with business requirements.

Design: Guidance for building of platforms to meet business demand.

Implement: Guidance for consuming real-time fit-for-purpose infrastructure optimally.

Operate: Guidance for running a fit-for-purpose enterprise cloud delivery model.

*FIG. 25*

CUSTOMIZABLE LIBRARY FOR INFORMATION TECHNOLOGY DESIGN AND MANAGEMENT USING EXPERT KNOWLEDGE BASE

CROSS-REFERENCE TO RELATED APPLICATIONS

This application is entitled to the benefit of, and claims priority to, provisional U.S. Patent Application Ser. No. 61/278,360 filed Oct. 6, 2009 and entitled "FLEXIBLE UNIFIED ENTERPRISE LIBRARY (FUEL) EXPLOITATION IN INFORMATION TECHNOLOGY EVOLUTION," the entirety of which is incorporated herein by reference.

The present application hereby incorporates herein by reference the following U.S. Patent Applications, as well as any publications thereof and patents issuing therefrom:

A. U.S. patent application Ser. No. 12/899,435, titled "INTEGRATED FORENSICS PLATFORM FOR ANALYZING IT RESOURCES CONSUMED TO DERIVE OPERATIONAL AND ARCHITECTURAL RECOMMENDATIONS", naming as inventors Anthony Bennett Bishop, Paul John Wanish, Alexis Salvatore Pecoraro, and Sheppard David Narkier, filed concurrently herewith on Oct. 6, 2010; and B. U.S. patent application Ser. No. 12/899,456, titled "INFRASTRUCTURE CORRELATION ENGINE AND RELATED METHODS", naming as inventors Sheppard David Narkier, Anthony Bennett Bishop, Paul Edward Renaud, Alexis Salvatore Pecoraro, and Paul John Wanish, filed concurrently herewith on Oct. 6, 2010.

COPYRIGHT STATEMENT

All of the material in this patent document is subject to copyright protection under the copyright laws of the United States and other countries. The copyright owner has no objection to the facsimile reproduction by anyone of the patent document or the patent disclosure, as it appears in official governmental records but, otherwise, all other copyright rights whatsoever are reserved.

BACKGROUND OF THE PRESENT INVENTION

1. Field of the Present Invention

The present invention relates generally to expert systems for information technology design, analysis, modeling and management.

2. Background

Information Technology ("IT"), which as used herein generally refers to the computer equipment, systems, processes and other infrastructure that support all business activities within a company or other organization, has become increasingly important to each such company. Nearly always, each company's IT must perform numerous specific business processing functions, sometimes referred to herein as Business Applications, in which particular business problems are solved. The IT elements necessary to fulfill a particular business processing requirement are sometimes collectively referred to hereinafter as a Business Application and include both physical (e.g., computer hardware and other equipment) and non-physical elements. The non-physical elements include Programs, which include the computer code (including both coding and configuration parameters) deployed on IT equipment to solve the applicable business problems. Plans in which a business investment is made to change some aspect of the IT operating model may be referred to herein as transformations or transformation programs.

Computer programs, which includes the computer code deployed on information technology equipment used to solve a business program, and in particular includes the coding and configuration parameters to fulfill a Business Application, are complex algorithms applied to business problems. They can be purely mathematical, such as wave form analysis. Or, they may be finance management, such as home banking. All of these are developed and deployed with specification and testing before being put into production. There have been many documents that prescribe how to invent and create the necessary algorithms and processes, but all have left it to the technologists to evaluate the problem space and independently work through the selection process for technologies that are relevant for the computer algorithms that will be employed. Historically, Program designers and developers have had to use generalized guidance, and create and deploy the application based on personal experience and insight. This process lacks rigor and does not prove "completeness" in the design, providing the opening for erroneous implementation and defective delivery. Furthermore, it also lacks definitive linkage to a comprehensive set of Business requirements that include operational requirements. Often these requirements are discovered after that application is deployed, causing delays, errors and, loss of money and reputation.

Integrating all of the physical and non-physical elements of a given Business Application creates many further complexities, from the design and development of the various elements through deployment and maintenance of the complete Business Application. Unfortunately, aside from limited individualized guidance for particular elements, as described above, it has traditionally been difficult to find cohesive, methodical, or customized assistance in implementing the various tasks associated with a Business Application life cycle.

Some assistance in conceptualizing the relationship between IT and business needs was provided by work done by Michael Porter in 1985. He introduced the concept of a Business Value Chain (BVC), which is a generic value chain model that comprises a sequence of activities found to be common to a wide range of firms. Porter identified key activities, including policies and decisions, interrelationships, integration and scale that strongly apply to the general function(s) required of IT. However, a need remained for a systematic approach, dedicated tools, and the like to assist in the actual design and management of IT. Without these things, typical problems encountered include a lack of alignment between the BVC and IT, overlapping and missing functionality in the business platform, a continuous battle with missed customer expectations, rigid and brittle infrastructure, IT Delivery and resources being unable to keep up with demand, a lack of definitive examples on how to document, a heavier reliance on tribal knowledge for how to get things done, aging documentation without the ability to search in context, and many others.

The credit crisis and a struggling economic climate radically alter every industry, resulting in tightening of corporate budgets and generating a renewed interest in operational efficiency. Other key factors include increasing globalization, which creates both opportunities and threats to any size business, and an increasing level of regulatory pressures. All of these factors have increased the need for businesses to carefully consider what strategic investments should be made and have forced businesses to be more adaptive to their changing surroundings in order to compete successfully.

IT should be a significant participant in this effort. This is an opportunity to perform strategic house cleaning, while helping the business manage costs, while also establishing the premise that IT is the strategic partner to prepare for the future.

SUMMARY OF THE PRESENT INVENTION

Broadly defined, the present invention according to one aspect is a method for providing a library platform, customized for use by a particular customer, of informational elements that each pertain to one or more of information technology analysis, modeling, design and management, including: creating a non-customized knowledge base, arranged in the form of discrete informational elements that each incorporate intellectual property describing an aspect of information technology analysis, modeling, design and/or management; in a data store; defining a high-level framework in which a plurality of the discrete informational elements may be arranged; presenting an unpopulated data tree, having data connection points established according to the high-level framework, to a first user via a user interface implemented on a computer; in conjunction with presentation of the unpopulated data tree, presenting the informational elements of the knowledge base to the first user for customized selection and placement thereof on the tree, wherein selection and placement is based on characteristics, known to the first user, about an information technology system of a particular customer; in response to selection of a particular informational element, by the first user, from the knowledge base, facilitating the attachment of the selected informational element at a data connection point on the tree, thereby forming a tree node, such that the high-level framework provides semantic context for the selected informational element; presenting the updated tree to the first user; iteratively repeating the three preceding steps until a library platform, comprising a fully-populated tree that is customized for use by the particular customer, is completed; and providing the completed library platform to the particular customer for use in one or more of designing, analysis, modeling and managing the information technology system of the customer.

In a feature of this aspect, providing the completed library platform to the particular customer includes presenting the completed library platform to a user, designated by the customer, via a user interface implemented on a computer. In a further feature, the three iteratively repeated steps are carried out via a first user interface and the step of providing the completed library platform to the particular customer is carried out via a second user interface.

In another feature of this aspect, creating the non-customized knowledge base includes incorporating at least twenty discrete informational problem domain elements in the arrangement. In a further feature, creating the non-customized knowledge base includes incorporating at least 200 discrete informational elements in the arrangement.

In another feature of this aspect, creating the non-customized knowledge base includes incorporating a plurality of discrete informational support elements in the arrangement for each of a majority of the problem domain elements. In a further feature, creating the non-customized knowledge base includes incorporating an average of at least three discrete informational support elements in the arrangement for each of the problem domain elements.

In another feature of this aspect, creating the non-customized knowledge base includes incorporating informational elements of different types. In further features, at least some of the discrete informational elements are playbooks, at least some of the discrete informational elements are documents, at least some of the discrete informational elements are toolkits, at least some of the discrete informational elements are templates, at least some of the discrete informational elements are how-to guides for particular information technology analysis, modeling, design or management processes, and/or at least some of the discrete informational elements are illustrative examples of particular aspects of information technology analysis, modeling, design and management. In a still further feature, creating the non-customized knowledge base includes incorporating discrete informational element types that include at least two, three or four types selected from the following group: playbooks, documents, toolkits, templates, how-to guides and illustrative examples.

In another feature of this aspect, the high-level framework is implemented by arranging the tree, including at least some of the data connection points thereon, to correspond with an information technology program life cycle. In further features, presenting the data tree includes segregating the data connection points by at least three phases of the information technology program life cycle; and the at least three phases are selected from the group comprising an align phase, a design phase, an implement phase, an operate phase, and a sustain phase.

In another feature of this aspect, providing the completed library platform to the particular customer includes presenting the fully-populated data tree to the customer. In a further feature, presenting the fully-populated data tree to the customer includes presenting the fully-populated data tree to a user, designated by the customer, in a manner that is tailored to a role of the user and to the way the user uses information in their day-to-day activities. In still further features, presenting the fully-populated data tree to the customer includes displaying top-level nodes to the user; presenting the fully-populated data tree to the customer further includes displaying at least one lower-level node to the customer-designated user in response to selection of a top-level node thereby; the top-level nodes displayed to the customer-designated user are displayed in an arrangement corresponding to an information technology program life cycle; the arrangement of top-level nodes includes segregation by at least three phases of the information technology program life cycle; and the at least three phases are selected from the group comprising an align phase, a design phase, an implement phase, an operate phase, and a sustain phase. In still further features, the top-level nodes displayed to the customer-designated user are displayed in an arrangement corresponding to a set of information technology system analysis, modeling, design and/or management domains; the arrangement of top-level nodes includes segregation by at least three information technology system analysis, modeling, design and/or management domains; and the at least three information technology system analysis, modeling, design and/or management domains are selected from the group comprising a strategy domain, a quality of experience domain, an operating model domain, an architecture domain, and a run-time execution domain. In a still further feature, providing the completed library platform to the particular customer includes presenting interactive storyboard information, pertaining to various aspects of information technology analysis, modeling, design and/or management, to a user designated by the customer, wherein the interactive storyboard information is linked to corresponding nodes in the fully-populated data tree such that the customer-designated user can navigate the data tree via the interactive storyboard information.

Broadly defined, the present invention according to another aspect is a computer-readable medium containing a program for executing a method for providing a library platform, customized for use by a particular customer, of informational elements that each pertain to one or more of informational technology analysis, modeling, design and management, the method including the following steps: storing, in a database, a collection of discrete informational elements that each incorporate intellectual property describing an aspect of information technology analysis, modeling, design and/or management, the informational elements collectively forming a non-customized knowledge base; maintaining a high-level framework in which a plurality of the discrete informational elements may be arranged; presenting an unpopulated data tree, having data connection points established according to the high-level framework, to a first user via a user interface implemented on a computer; in conjunction with presentation of the unpopulated data tree, presenting the informational elements of the knowledge base to the first user for customized selection and placement thereof on the tree, wherein selection and placement is based on characteristics, known to the first user, about an information technology system of a particular customer; in response to selection of a particular informational element, by the first user, from the knowledge base, attaching the selected informational element at a data connection point on the tree, thereby forming a tree node, such that the high-level framework provides semantic context for the selected informational element; presenting the updated tree to the first user; iteratively repeating the three preceding steps until a library platform, comprising a fully-populated tree that is customized for use by the particular customer, is completed; and producing one or more output files, whose content represents the completed library platform, for use by the particular customer for use in one or more of designing, analysis, modeling and managing the information technology system of the customer.

Broadly defined, the present invention according to another aspect is a system for providing a library platform, customized for use by a particular customer, of informational elements that each pertain to one or more of information technology analysis, modeling, design and management, including: a database containing a collection of discrete informational elements that each incorporate intellectual property describing an aspect of information technology analysis, modeling, design and/or management; a computer implementing a first user interface usable to customize a library platform, arranged in the form of a data tree that is segregated according to a high-level framework, for use by a particular customer, wherein the data tree is populated, using the first user interface, by iteratively selecting informational elements from the database and attaching the informational elements to the data tree at connection points such that the high-level framework provides semantic context for the selected informational elements, and wherein selection and attachment is carried out at least in part based on characteristics about an information technology system of the particular customer; and a computer implementing a second user interface usable to view the customized library platform, in the form of the fully-populated data tree, such that the data tree provides semantic context to a user, designated by the customer, for the informational elements attached thereto.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

Further features, embodiments, and advantages of the present invention will become apparent from the following detailed description with reference to the drawings, wherein:

FIG. 10 is an exemplary depiction of the IP Catalogue Setup screen of FIG. 9 after one of the nodes in the tree at left has been selected;

FIG. 25 is an exemplary depiction of still another navigational screen of a user interface for consumers viewing or accessing the knowledge base via a customized library platform in accordance with one or more preferred embodiments of the present invention;

DETAILED DESCRIPTION

Figure 1:
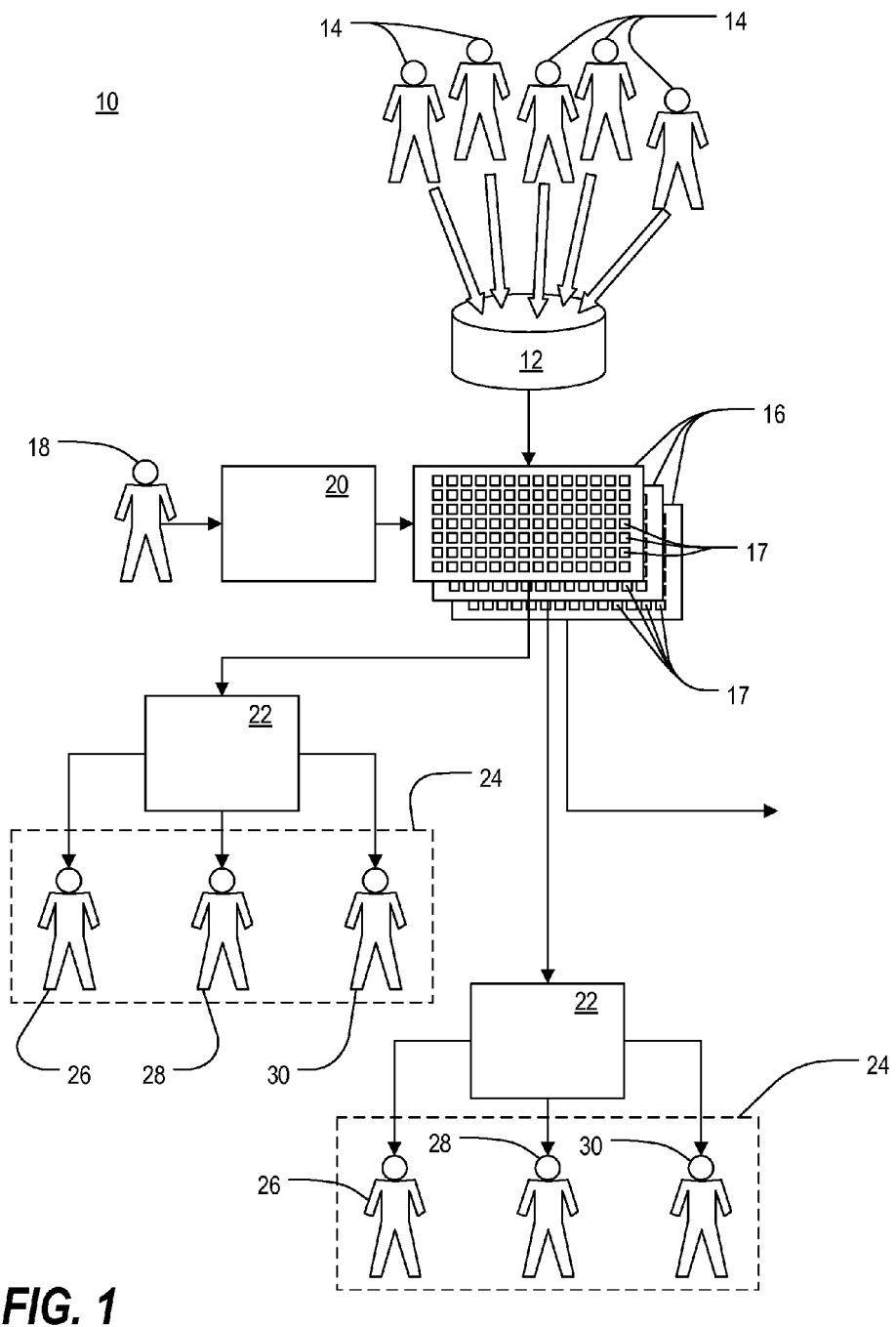
FIG. 1 is a conceptual block diagram of a system for providing a customizable library for information technology design and management using an expert knowledge base in accordance with one or more preferred embodiments of the present invention.

As a preliminary matter, it will readily be understood by one having ordinary skill in the relevant art ("Ordinary Artisan") that the present invention has broad utility and application. Furthermore, any embodiment discussed and identified as being "preferred" is considered to be part of a best mode contemplated for carrying out the present invention. Other embodiments also may be discussed for additional illustrative purposes in providing a full and enabling disclosure of the present invention. Moreover, many embodiments, such as adaptations, variations, modifications, and equivalent arrangements, will be implicitly disclosed by the embodiments described herein and fall within the scope of the present invention.

Accordingly, while the present invention is described herein in detail in relation to one or more embodiments, it is to be understood that this disclosure is illustrative and exemplary of the present invention, and is made merely for the purposes of providing a full and enabling disclosure of the present invention. The detailed disclosure herein of one or more embodiments is not intended, nor is to be construed, to limit the scope of patent protection afforded the present invention, which scope is to be defined by the claims and the equivalents thereof. It is not intended that the scope of patent protection afforded the present invention be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection afforded the present invention is to be defined by the appended claims rather than the description set forth herein.

Additionally, it is important to note that each term used herein refers to that which the Ordinary Artisan would understand such term to mean based on the contextual use of such term herein. To the extent that the meaning of a term used herein—as understood by the Ordinary Artisan based on the contextual use of such term—differs in any way from any particular dictionary definition of such term, it is intended that the meaning of the term as understood by the Ordinary Artisan should prevail.

Furthermore, it is important to note that, as used herein, "a" and "an" each generally denotes "at least one," but does not exclude a plurality unless the contextual use dictates otherwise. Thus, reference to "a picnic basket having an apple" describes "a picnic basket having at least one apple" as well as "a picnic basket having apples." In contrast, reference to "a picnic basket having a single apple" describes "a picnic basket having only one apple."

When used herein to join a list of items, "or" denotes "at least one of the items," but does not exclude a plurality of items of the list. Thus, reference to "a picnic basket having cheese or crackers" describes "a picnic basket having cheese without crackers," "a picnic basket having crackers without cheese," and "a picnic basket having both cheese and crackers." Finally, when used herein to join a list of items, "and" denotes "all of the items of the list." Thus, reference to "a picnic basket having cheese and crackers" describes "a picnic basket having cheese, wherein the picnic basket further has crackers," as well as describes "a picnic basket having crackers, wherein the picnic basket further has cheese."

Referring now to the drawings, in which like numerals represent like components throughout the several views, the preferred embodiments of the present invention are next described. The following description of one or more preferred embodiment(s) is merely exemplary in nature and is in no way intended to limit the invention, its application, or uses.

FIG. 1 is a conceptual block diagram of a system 10 for providing a customizable library for information technology design and management using an expert knowledge base 12 in accordance with one or more preferred embodiments of the present invention. The system 10 includes a knowledge base 12 built from the experience and knowledge of a variety of experts 14, one or more customized library platforms 16 built by a library developer or designer 18 using a user interface 20 for knowledge base management, and one or more user interfaces 22 for customized library viewing for user by one or more specific end users 26,28,30 at a targeted customer or other consumer 24. Each of these will be described in greater detail hereinbelow.

Knowledge Base

In order to properly support and enable a business, the organizational element with functional responsibility for IT design and management must develop an understanding of the Business Value Chain (BVC) and how the business generates value. IT must also manage itself as a Digital Supply Chain (DSC) that can be tailored to meet these business demands.

The knowledge base 12 a suite of various resource materials 17 pertaining to IT design, management, and the like. Each such material 17 is sometimes referred to herein as "IP" or an "IP element," or sometimes "informational elements." In at least some embodiments, the materials represent or include proven practices, playbooks, work products, blueprints, tools and methods, developed by a variety of experts 14, such as architects, engineers, and the like, that provide the foundation needed to deliver IT transformation programs that meet the needs of the business. For example, the knowledge base 12 may make use of information about known problems and remediation tactics, which makes it possible to provide considerable value to a consumer 24 quickly and efficiently. This is accomplished through the design of packaged infrastructure ensembles, by a developer 18, that implement a library platform 16 specifically tailored to the needs of applications and services that run within that portion of the BVC of a targeted customer or other consumer 24. The consumer may include various end users 26,28,30 (i.e., the humans that interact with the technology) of different types, i.e., users with differing levels or types of technical expertise, business expertise, or the like. The collection of ensembles that make up a stage of the BVC are physically grouped together in a design that respects the underlying IT proximity optimization while striking the proper balance between performance, cost and efficiency, sometimes referred to herein as "Quality of Experience" (QoE). By exploiting these techniques, templates (or models) for any targeted consumer 24 or specific end user 26,28,30 are rendered, enabling systematic transformation of delivery and execution of technology. Leveraging the transformation library will enable any company to drive true transformation, with success and results.

Figure 2:
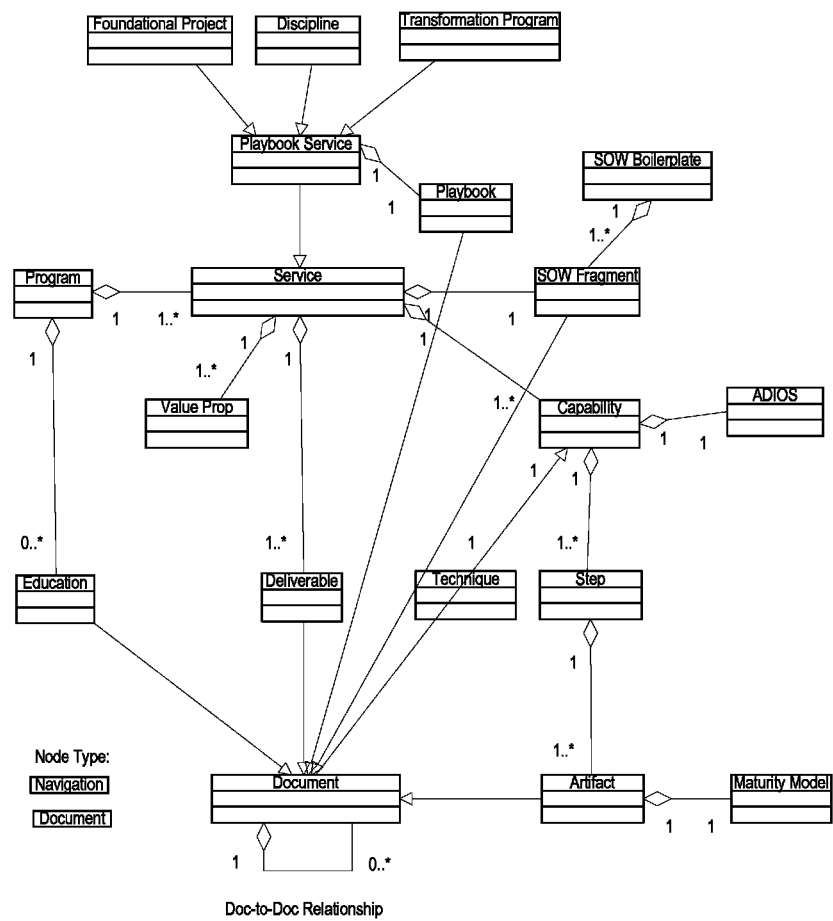
FIG. 2 is an exemplary schema mapping of the technical details maintained in the knowledge base of FIG. 1.

The knowledge base 12 is expressed in FIG. 2, which is an exemplary schema mapping of the technical details maintained in the information repository. It will be appreciated by the Ordinary Artisan that dozens or hundreds of functional classes may be incorporated into such a taxonomy, and further that technical support classes be incorporated as well. The knowledge base 12 contains instructional, educational information based, for example, on decades of experience. The knowledge base preferably includes a large number of discrete informational elements 17, including both complex problem domain elements and support elements (wherein the support elements are arranged as attributes of the problem domain elements). Preferably, the knowledge base includes at least twenty discrete problem domain elements 17; more preferably, the knowledge base includes at least 100 discrete problem domain elements 17; still more preferably, the knowledge base includes at least 200 discrete problem domain elements 17. Furthermore, it is preferred that the majority of the problem domain elements include a plurality of support elements, and even more preferred that, on average, three support elements, and sometimes five or more support elements, are provided for each problem domain element. The volume make it difficult and impractical to digest the entire content. Therefore, logic is used to segment the information into only those that pieces of information that pertain to a particular issue or stage, and can be digested. Advancements in the creation of the Program creation change the information available. This enables the consumer to be able to digest the concepts and apply the information. By refining the Program information, the information can also be transformed to create relevant assumptions on how to implement or test the Program.

A collection of playbooks in the knowledge base 12 provides a detailed and disciplined program that amplifies the impact of IT transformation initiatives while serving as a guide to creating a sustaining operating model. At its core a playbook is a proven guide to implementation of an IT service solution, which includes the people, process and technology needed to create a transformation within an IT organization. Once realized, it acts as a building block upon which additional IT services can be built and leveraged to further facilitate transformation. These playbooks represent techniques and practices that generate known and measurable results while overcoming typical transformation roadblocks.

Figure 3:
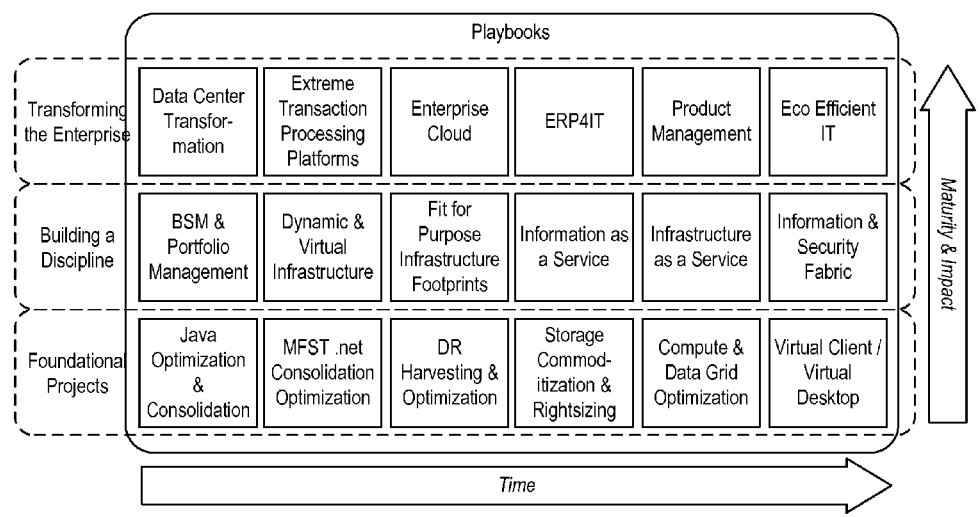
FIG. 3 is a graphical representation of various playbooks from the knowledge base of FIG. 1, measured against the parameters of time and maturity/impact.

FIG. 3 is a graphical representation of various playbooks from the knowledge base 12 of FIG. 1, measured against the parameters of time and maturity/impact. Foundational Project playbooks, which may be of the lowest maturity and impact, may include, arranged approximately from least time to most time, Java optimization and consolidation, MSFT .net consolidation and optimization, DR harvesting and optimization, storage commoditization and right-sizing, computer and data grid optimization, and virtual client/virtual desktop. Building a Discipline playbooks, which may be of intermediate maturity and impact, may include, arranged approximately from least time to most time, BSM and portfolio management, dynamic and virtual infrastructure, fit-for-purpose infrastructure footprints, information as a service and information and security fabric. Transforming the enterprise playbooks, which may be of the highest maturity and impact, may include, arranged approximately from least time to most time, data center transformation, extreme transaction processing platforms, enterprise cloud, ERP4IT, product management, and eco-efficient IT.

The present invention contemplates the methodical decomposition of the life cycle of an application or service. After the decomposition, this invention articulates the processing of these decomposed factors to algorithmically identify the relevant documentation, best practices for the program development, and relevant educational topics and technology options for the Program or Business Application deployment.

Figure 4:
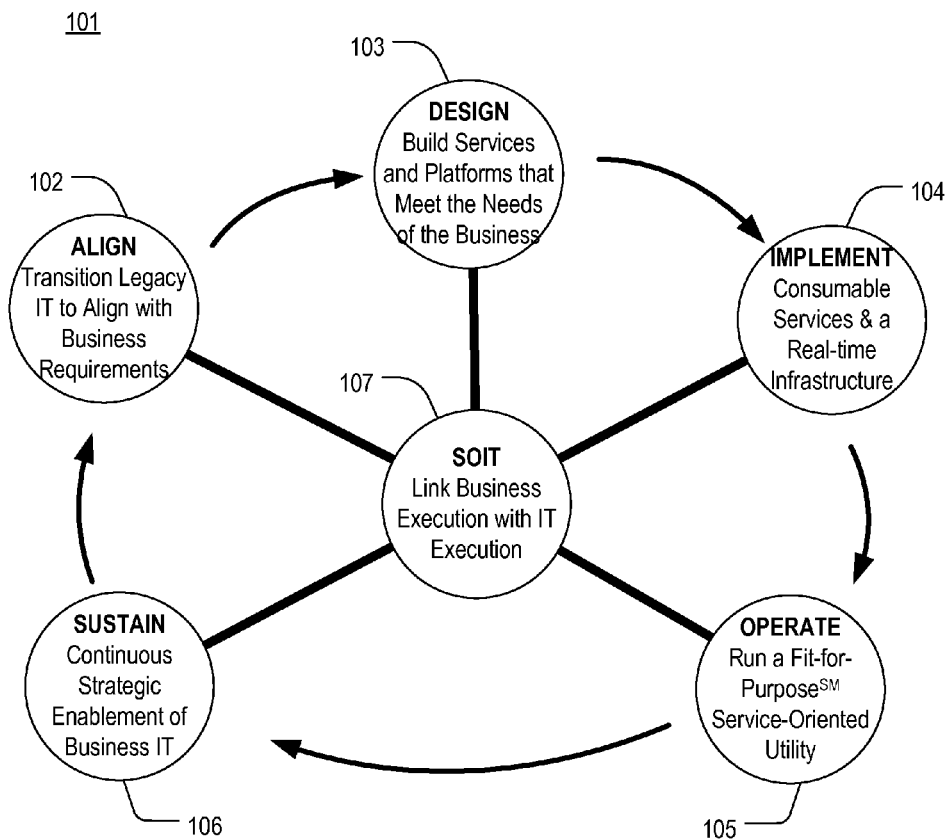
FIG. 4 is a block diagram illustrating a five segment approach to the Program life cycle in accordance with one or more preferred embodiments of the present invention.

In particular, in at least some embodiments, the invention takes a holistic view of the life cycle of the Program or Business Application, based for example on a five segment approach to solving a business problem. FIG. 4 is a block diagram illustrating a five segment approach to the Program life cycle 101 in accordance with one or more preferred embodiments of the present invention. It is very useful for the consumer to properly identify the phase in the Program life cycle (usually the current phase) that is of interest, because it is often the first or primary factor used to narrow down the relevant intellectual property in the knowledge base 12.

As the consumer provides more data, the process converts the old and new information to further narrow the relevant information. Finally, once the business needs are clearly defined, the relevant intellectual property can be algorithmically integrated with the specific business needs into the appropriate documentation and planning activities.

As shown in FIG. 4, a Program life cycle 101 may include four major areas 102,103,104,105 that a Program flows through during development. Additionally, the Program must preferably be sustained (represented by the Sustain block 106), continuing to exist, operate and potentially adapt to new business needs. The collection of steps or phases 102,103, 104,105,106 (sometimes referred to herein as "ADIOS") converge to render a Services Oriented Information Technology (SOIT) 107 that has been created and aligned to business needs and optimized to deliver the required quality of service.

As used in this application, the terms "component" and "system" are usually intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

As used herein, the term to "infer" or "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Some aspects of the present invention are enabled or initialized for the consumer 24 through a portal view into the Knowledge Base 12. Because of the volume of information, it is important to establish the segment of the life cycle that information is needed on. Initially, this is accomplished by defining or identifying a Program (or Business Application) that this session is related to. If the transformation program is needed for the design, development and deployment of a new Business Application, the Program would be said to be in the "Align" phase 102. Eventually, everyone should be viewing this tool from the strategic planning point of view, and starting with Align 102. But transformation programs are about change, so often the consumer finds themselves in the Operate phase 105. In this phase, the templates and guidance are more relevant to the operational data collection activities, which then lead into an Align step on the way that the IT is being used (and therefore leading to a transformation).

Often, people responsible for the deployment of the Business Application know a lot about the needs and plan, and really need to validate their assumptions or have templates that could narrow down the decisions that would need to make. This type of need is satisfied within the Design phase 103. An example of this use would be when the designer is trying to figure out how to satisfy the need for a web portal into an information repository. The consumer 22 would be researching at the Design phase 103 the set of patterns that could apply. For the HTTP server, there may be several patterns that could apply. But based on response time, volumes, dispersion of the end user community or need for two phase commits on data access, several detailed Patterns might be exposes, and the limitations on each would be revealed.

In planning for the ultimate deployment of the Business Application, research into the Operation segment 105 of ADIOS would be appropriate. The operations team might act as the consumer, and research the types of instrumentation and monitoring that would be appropriate. The Operate segment 105 extends the current tasks performed, by including sufficient data gathering and correlation tools to provide information around how the Business Application is executing, which allows for assessments of the QoE and fulfillment of Service Level Agreements (SLAs), often not tracked today, providing an inefficiency in the execution. A system of the present invention may provide the templates for the necessary data gathering.

Collectively, the phases 102,103,104,105,106 of the Program life cycle 101 are sometimes referred to herein as the "ADIOS" Program life cycle model, or the ADIOS model. It should be clear that all the segments of the ADIOS model, and the use of a tool in accordance with the present invention, would be tied together in a mature IT organization, with new requirements proceeding through the steps of Align, Design, Implement, Operate and Sustain. A system of the present invention would provide the tailored information for the consumer 22 to help build a robust and efficient operational environment while meeting the business needs. When combined with a tool for the best practice deployment recommendations and a tool for the data aggregation on the actual operational measurements, a complete audit trail can be implemented, ensuring a complete and rigorous process is followed in the development and deployment of a Business Application.

It is strongly preferred that only appropriate technical documentation is made available to the particular end user 26,28,30, rather than supplying the entirety of the information generically to the consumer 24. Specific end users may, for example, include business planners, Program or Business Application architects, Program or Business Application designers, Program or Business Application testers, hardware planners and operational support teams. The content is based on the phase of the life cycle the consumer 24 is in, and is tailored to the specific needs for the consumer 24, and more particularly, to the specific needs for the end user 26,28,30. Furthermore, in at least some embodiments, consumers 24 may place key documents and document templates of their own into the knowledge base 12 that can be organized along many lines.

To assist in narrowing down the amount of information that must be considered, an interactive dialog may be used. The complex Business Application is defined, as to the state of the deployment, its maturity assessed and the functionality required decomposed into one or more of reusable patterns. The patterns, with well defined attributes, enable complete set of information needed for the proper functioning of the Business Application. A system of the present invention assists with the tailoring of the components of the Business Application, the data collection and retention and providing enabling information to other tools.

Figure 5:
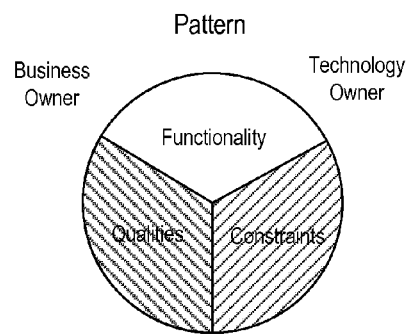
FIG. 5 is a symbolic representation of the smallest reusable business component, sometimes referred to herein as a Pattern, that may make up a Program.

FIG. 5 is a symbolic representation of the smallest reusable business component, sometimes referred to herein as a Pattern that may make up a Program. The Pattern is made up of the parts that are common between all components that must run in production. Function is the reference to what the code must successfully perform, typically on some sort of data source, to be considered "useful". This function always has associated Qualities that make the function acceptable to the consumer. The Business Owner expects the function to work within these predefined Qualities. Typical Qualities are response time, access capability or level of security provided. While some qualities are binary, many are measurable, and they form the most significant differentiators between patterns. Constraints are often overlooked, but they are critical to the successful operation, and to achieve many Qualities. Examples of these constraints may include maximum number of concurrent users, average response time, limits on cost of delivery and the size of messages being sent. A corollary to this definition is that any perturbation observed in the operational metrics of the Qualities shall have related changes in at least one constraint. The two major players in the Business Application deployment are the Business Owner and the Technology Owner. The Business Owner is interested in receiving the Functionality delivered with the specified Qualities. The Technology Owner is motivated to provide the Functionality, within the identified Constraints. The invention codifies the 'agreement' between the Business Owner and the Technology Owner before the Program is deployed.

Figure 6:
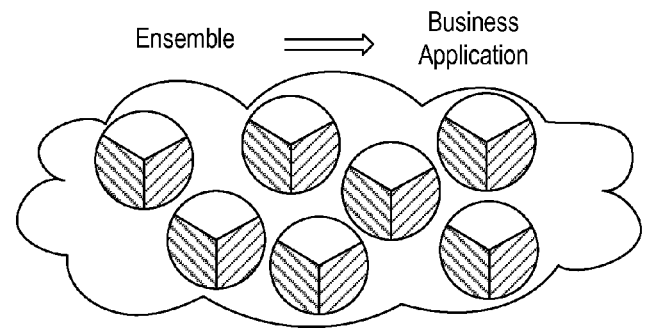
FIG. 6 is a block diagram expression of the collection of Patterns (or reusable functionality) that together represent the Business Application.

FIG. 6 is a block diagram expression of the collection of Patterns (or reusable functionality) that together represent the Business Application. The Business Application uses a collection of Patterns that perform reusable services. An Ensemble acts as an abstraction of the collection of functions with an aggregation of Qualities and Constraints. FIG. 6 represents the concept that Business Applications are normally a combination of well known Patterns. Initially, the consumer expresses the Program in terms of Pattern Genus. When aggregated, and potentially extended with unique functionality only known to the Business Owner, the Business Application can be designed, implemented, tested and finally deployed into a production environment.

Computer System

Figure 7:
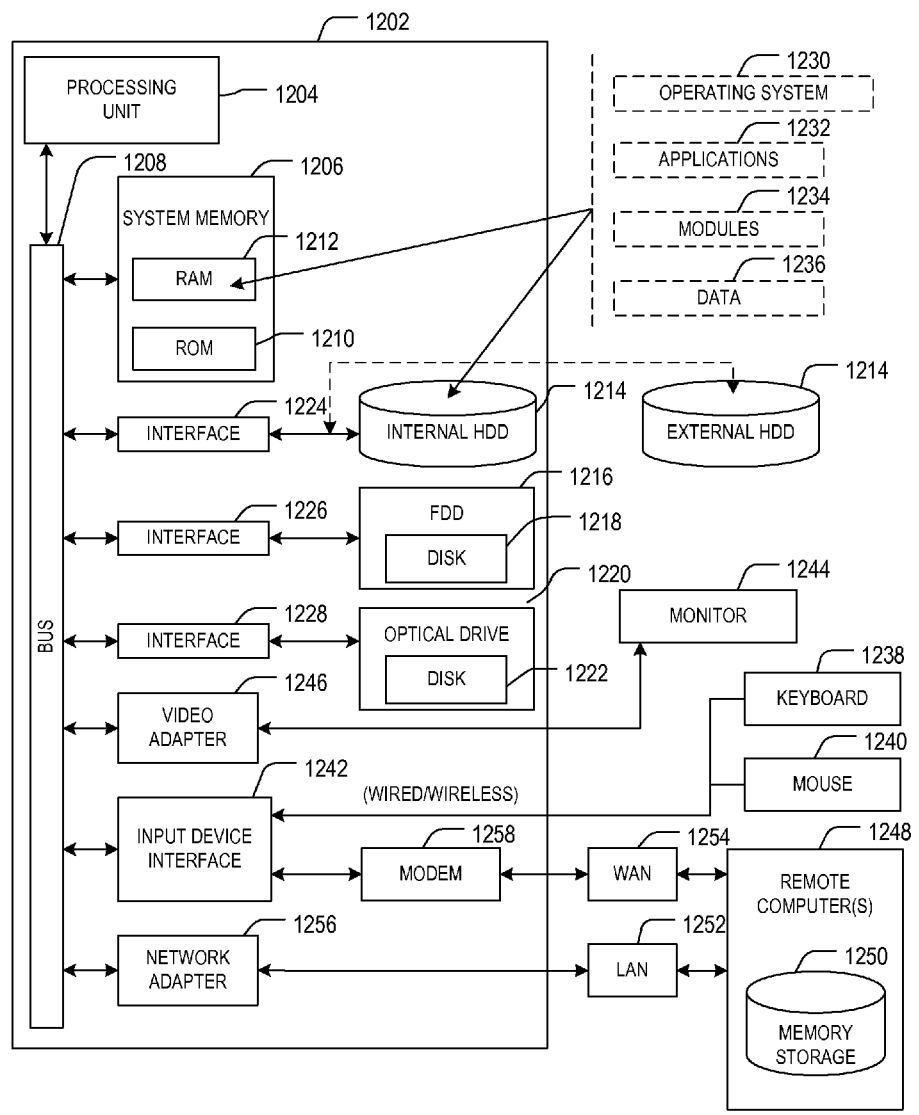
FIG. 7 is a block diagram of a computer system operable to execute the architecture in accordance with one or more preferred embodiments of the present invention.

FIG. 7 is a block diagram of a computer system 1200 operable to execute the architecture in accordance with one or more preferred embodiments of the present invention. While the innovation is been described herein in the general context of computer-executable instructions that may run on one or more computers, those skilled in the art will recognize that the innovation also is relevant and can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 7, the exemplary environment 1200 for implementing various aspects of the innovation includes a computer 1202, the computer 1202 including a processing unit 1204, a system memory 1206 and a system bus 1208. The system bus 1208 couples system components including, but not limited to, the system memory 1206 to the processing unit 1204. The processing unit 1204 can be any of various commercially available processors. Dual microprocessors and other multi-processor architectures may also be employed as the processing unit 1204.

The system bus 1208 can be any of several types of bus structure that may further interconnect to a memory bus (with or without a memory controller), a peripheral bus, and a local bus using any of a variety of commercially available bus architectures. The system memory 1206 includes read-only memory (ROM) 1210 and random access memory (RAM) 1212. A basic input/output system (BIOS) is stored in a non-volatile memory 1210 such as ROM, EPROM, EEPROM, which BIOS contains the basic routines that help to transfer information between elements within the computer 1202, such as during start-up. The RAM 1212 can also include a high-speed RAM such as static RAM for caching data.

The computer 1202 further includes an internal hard disk drive (HDD) 1214 (e.g., EIDE, SATA), which internal hard disk drive 1214 may also be configured for external use in a suitable chassis (not shown), a magnetic floppy disk drive (FDD) 1216, (e.g., to read from or write to a removable diskette 1218) and an optical disk drive 1220, (e.g., reading a CD-ROM disk 1222 or, to read from or write to other high capacity optical media such as the DVD). The hard disk drive 1214, magnetic disk drive 1216 and optical disk drive 1220 can be connected to the system bus 1208 by a hard disk drive interface 1224, a magnetic disk drive interface 1226 and an optical drive interface 1228, respectively. The interface 1224 for external drive implementations includes at least one or both of Universal Serial Bus (USB) and IEEE 1394 interface technologies. Other external drive connection technologies are within contemplation of the subject innovation.

The drives and their associated computer-readable media provide nonvolatile storage of data, data structures, computer-executable instructions, and so forth. For the computer 1202, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the innovation.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. It is appreciated that the innovation can be implemented with various commercially available operating systems or combinations of operating systems.

A user can enter commands and information into the computer 1202 through one or more wired/wireless input devices, e.g., a keyboard 1238 and a pointing device, such as a mouse 1240. Other input devices (not shown) may include a microphone, an IR remote control, a joystick, a game pad, a stylus pen, touch screen, or the like. These and other input devices are often connected to the processing unit 1204 through an input device interface 1242 that is coupled to the system bus 1208, but can be connected by other interfaces, such as a parallel port, an IEEE 1394 serial port, a game port, a USB port, an IR interface, etc.

A monitor 1244 or other type of display device is also connected to the system bus 1208 via an interface, such as a video adapter 1246. In addition to the monitor 1244, a computer typically includes other peripheral output devices (not shown), such as speakers, printers, etc.

The computer 1202 may operate in a networked environment using logical connections via wired and/or wireless communications to one or more remote computers, such as a remote computer(s) 1248. The remote computer(s) 1248 can be a workstation, a server computer, a router, a personal computer, portable computer, microprocessor-based entertainment appliance, a peer device or other common network node, and typically includes many or all of the elements described relative to the computer 1202, although, for purposes of brevity, only a memory/storage device 1250 is illustrated. The logical connections depicted include wired/wireless connectivity to a local area network (LAN) 1252 and/or larger networks, e.g., a wide area network (WAN) 1254. Such LAN and WAN networking environments are commonplace in offices and companies, and facilitate enterprise-wide computer networks, such as intranets, all of which may connect to a global communications network, e.g., the Internet.

When used in a LAN networking environment, the computer 1202 is connected to the local network 1252 through a wired and/or wireless communication network interface or adapter 1256. The adapter 1256 may facilitate wired or wireless communication to the LAN 1252, which may also include a wireless access point disposed thereon for communicating with the wireless adapter 1256.

When used in a WAN networking environment, the computer 1202 can include a modem 1258, or is connected to a communications server on the WAN 1254, or has other means for establishing communications over the WAN 1254, such as by way of the Internet. The modem 1258, which can be internal or external and a wired or wireless device, is connected to the system bus 1208 via the serial port interface 1242. In a networked environment, program modules depicted relative to the computer 1202, or portions thereof, can be stored in the remote memory/storage device 1250. It will be appreciated that the network connections shown are exemplary and other means of establishing a communications link between the computers can be used.

The computer 1202 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11(a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

User Experience

Customized Library Designer/Developer

The knowledge base 12 may be managed by one or more user interface facilities. In various embodiments, the facilities may for example include an IP Catalogue Setup facility, a Library View Setup facility, or both, the latter being preferred in at least one contemplated commercial embodiment. In at least some embodiments, such facilities may be used to create one or more customized library platform 16.

Figure 8:
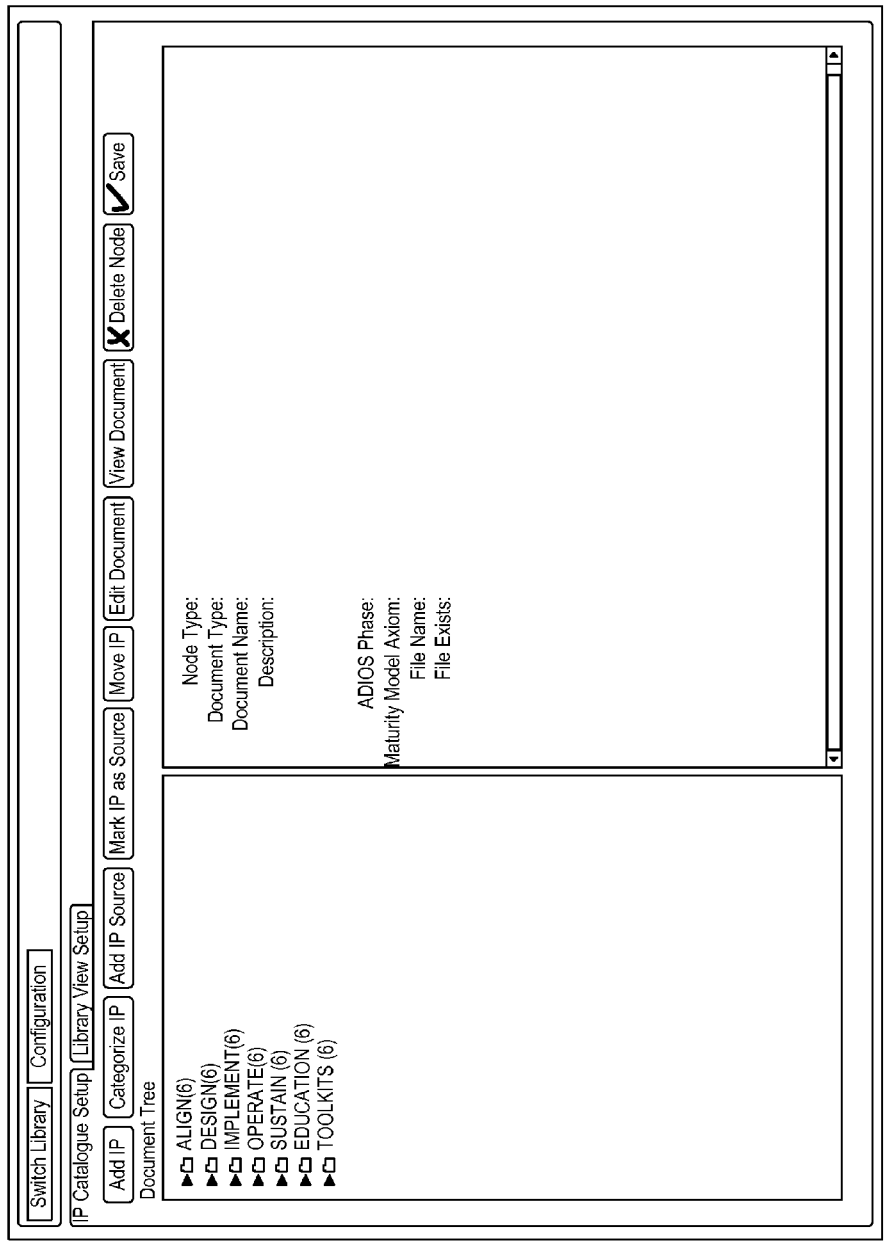
FIG. 8 is an exemplary depiction of an IP Catalogue Setup screen of a user interface for managing the knowledge base in accordance with one or more preferred embodiments of the present invention.

FIG. 8 is an exemplary depiction of an IP Catalogue Setup screen of a user interface 20 for managing the knowledge base 12 in accordance with one or more preferred embodiments of the present invention. The IP Catalogue Setup screen may be accessed via a selectable tab visible near the upper lefthand corner of the screen. The IP Catalogue Setup screen has a 2-panel view, with the left panel for navigation of a tree and the right panel for display of metadata of the selected node. This allows the user to attach and classify IP documents at various points on the tree. Selectable options (accessible via selectable buttons that may be arranged, for example, along the top of the screen) preferably include "Add IP," "Categorize IP," "Add IP Source," "Mark IP as Source," "Move IP," "Edit Document," "View Document," "Delete Node" and "Save." Use of the term "IP" in the foregoing options refers to the IP elements 17 described previously.

Figure 9:
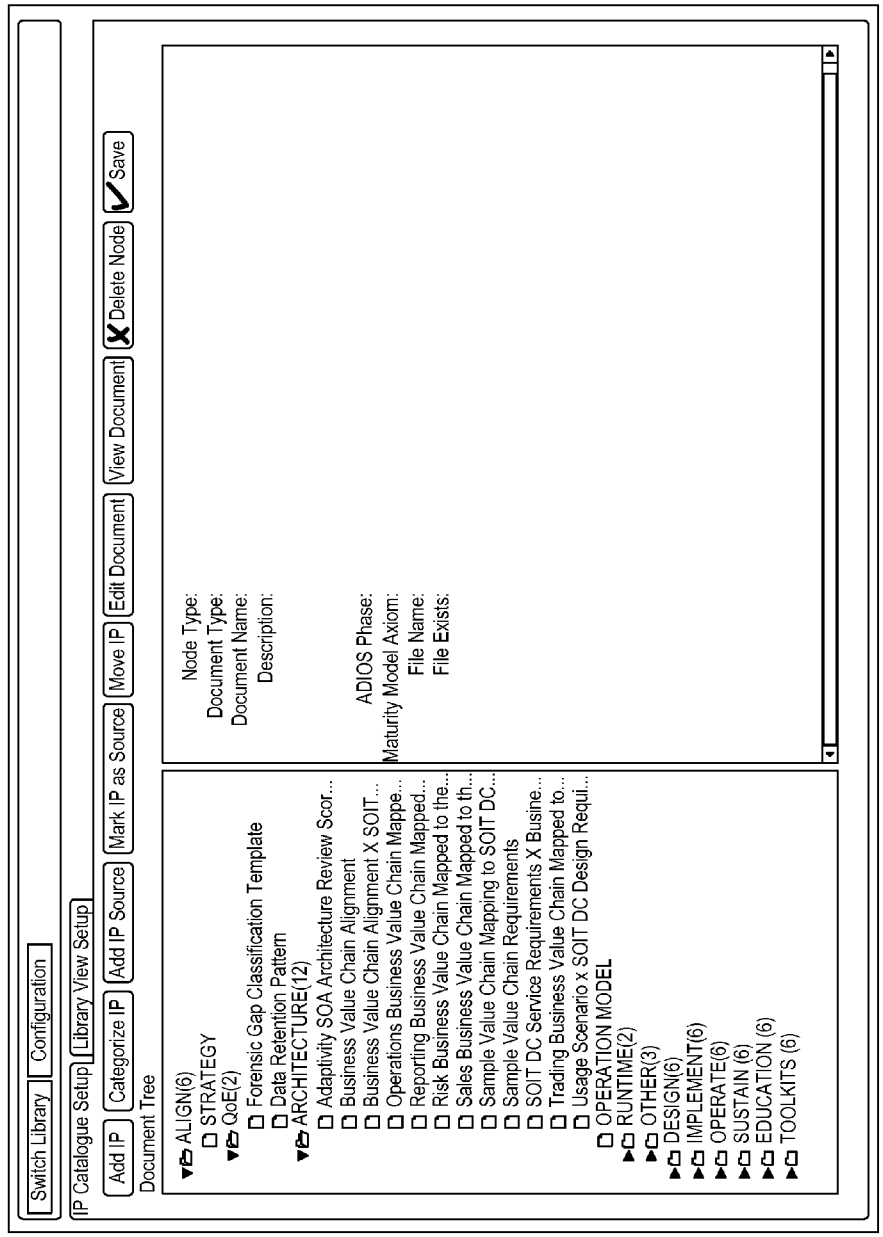
FIG. 9 is an exemplary depiction of the IP Catalogue Setup screen of FIG. 8 after some of the nodes have been expanded.

Various nodes, usually representing IP elements 17, may be added to the tree in the left panel. FIG. 9 is an exemplary depiction of the IP Catalogue Setup screen of FIG. 8 after some of the nodes have been expanded. The nodes may be added, edited, deleted and otherwise managed using tools accessible via options such as those enumerated previously.

Figure 10:
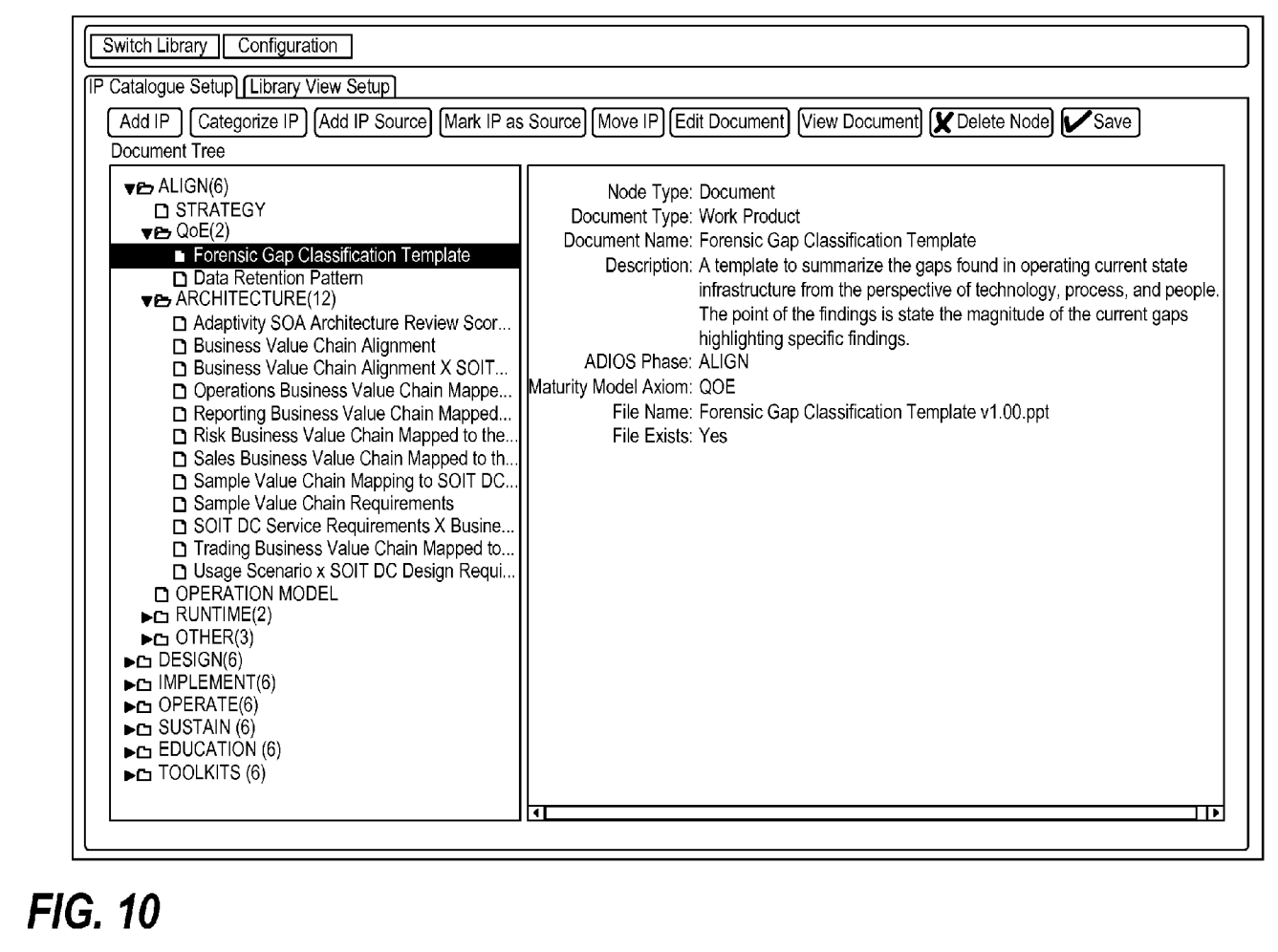

FIG. 10 is an exemplary depiction of the IP Catalogue Setup screen of FIG. 9 after one of the nodes in the tree at left has been selected. In particular, the node "Forensic Gap Classification Template" has been selected. Metadata for this selected node is displayed on the right.

The particular node that has been selected in FIG. 10 pertains to a specific document or other IP element 17. In addition to the metadata provided on the right, the node comprises a separate document (not shown), which may be viewed and/or edited using the selectable buttons at the top. The name for a computer-readable file, representing the document, is identified in the metadata. In the selected document node, the document name is "Forensic Gap Classification Template v1.00.ppt"

Figure 11:
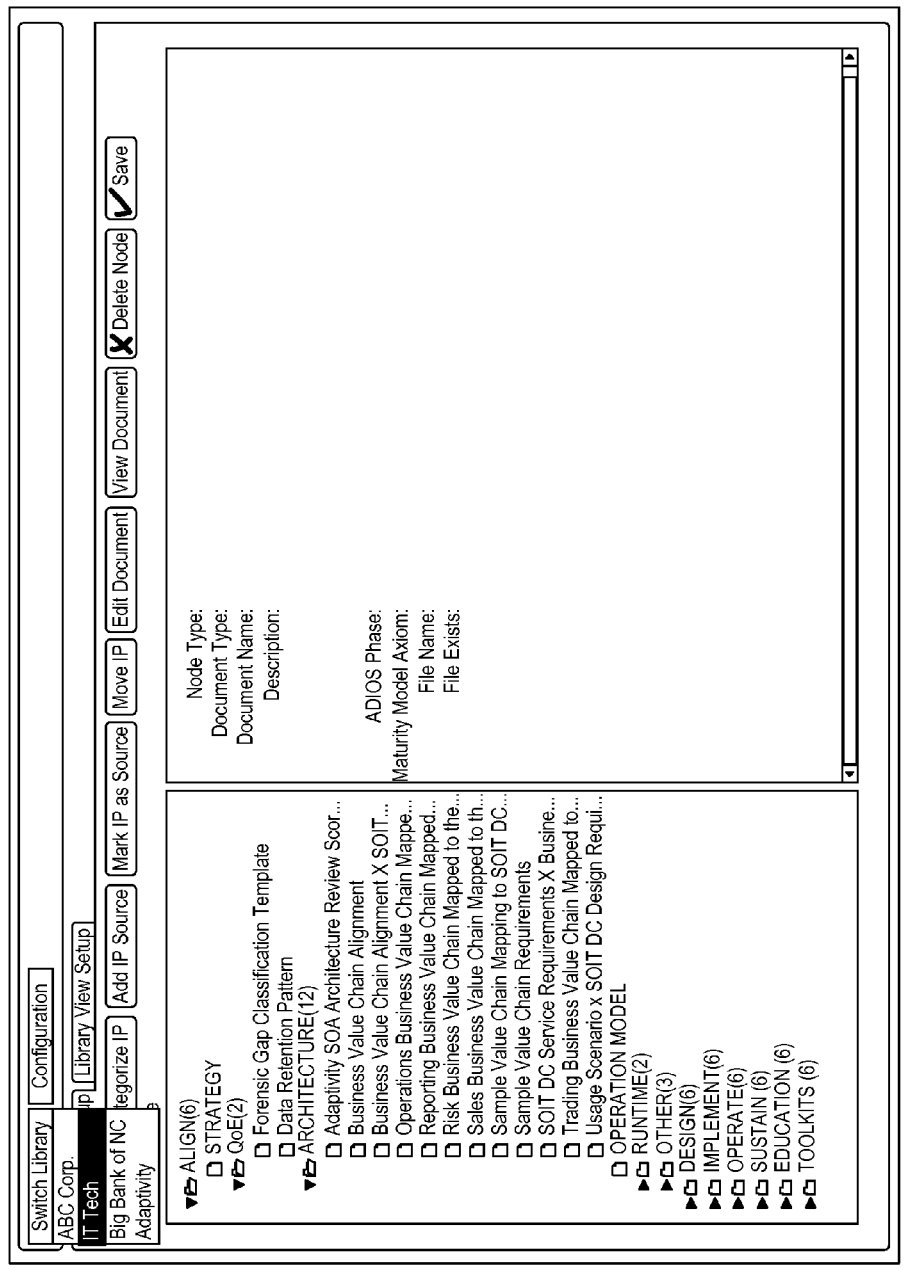
FIG. 11 is an exemplary depiction of the IP Catalogue Setup screen of FIG. 9 illustrating the selection of a particular library.

The IP Catalogue Setup facility may be utilized to create one or more customized libraries or library platforms 16 for various customers or other targeted users. FIG. 11 is an exemplary depiction of the IP Catalogue Setup screen of FIG. 9 illustrating the selection of a particular library or library platform 16. In particular, the particular library selected is the "IT Tech" library. Each library platform 16 is a different tree implementation of the generalized program life cycle (ADIOS) wherein the nodes of the tree are customized for the respective customer or other targeted user. As will be evident, the same underlying IP components 17 may be used in as many different customized libraries as desired. By changing the target directory in the configuration menu, the user can create and maintain multiple libraries for different customers.

Figure 12:
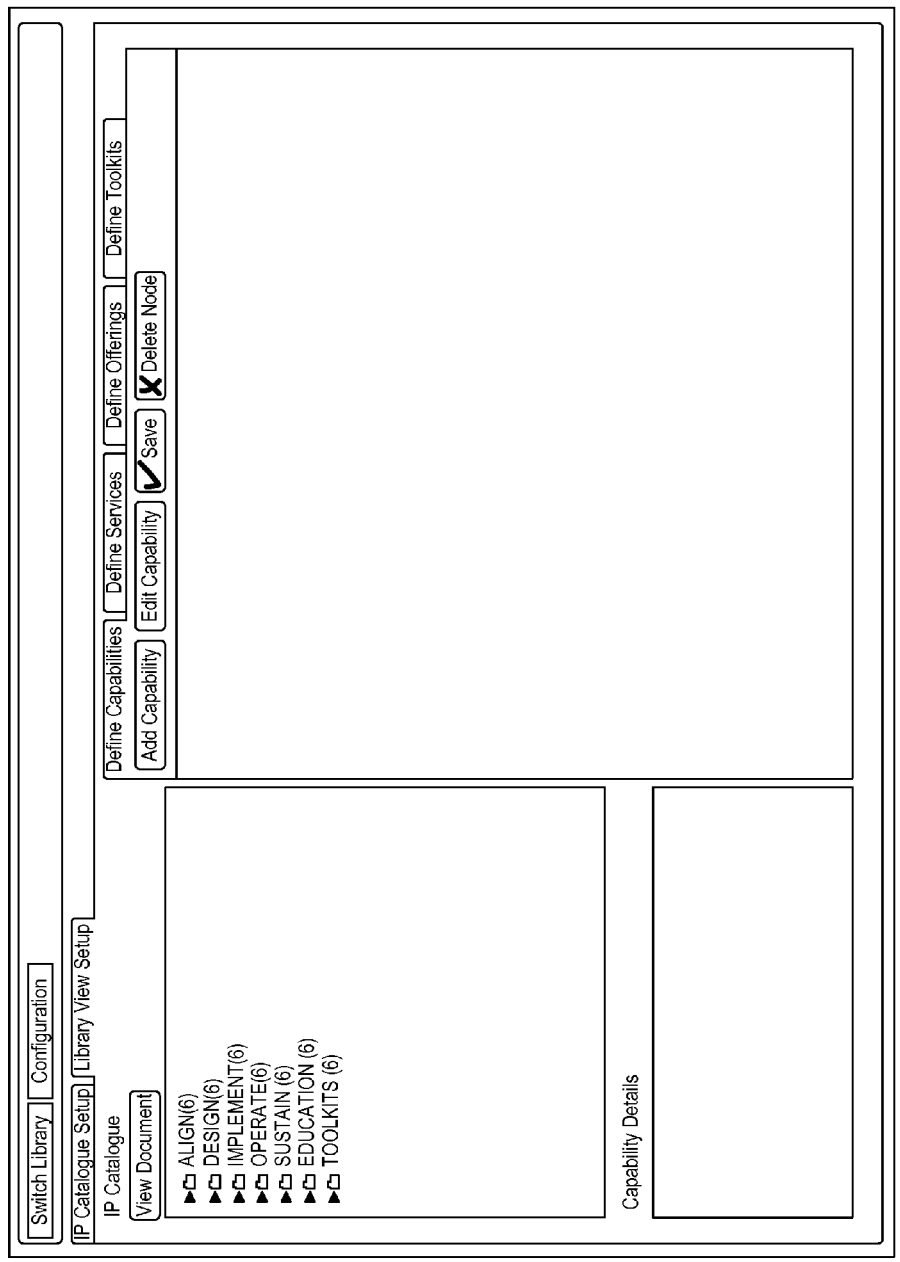
FIG. 12 is an exemplary depiction of a Library View Setup screen of a user interface for managing the knowledge base in accordance with one or more preferred embodiments of the present invention.

FIG. 12 is an exemplary depiction of a Library View Setup screen of a user interface 20 for managing the knowledge base 12 in accordance with one or more preferred embodiments of the present invention. The Library View Setup screen may be accessed via a selectable tab visible near the upper lefthand corner of the screen. The Library View Setup screen has a 5 panel view: on the left are the IP Catalogue Tree and a metadata display area. The right panel has 3 sections that allow the user to define and relate Offerings, Services and Capabilities. The user can then attach IP at various points in the tree to create a custom library for customer delivery.

Figure 13:
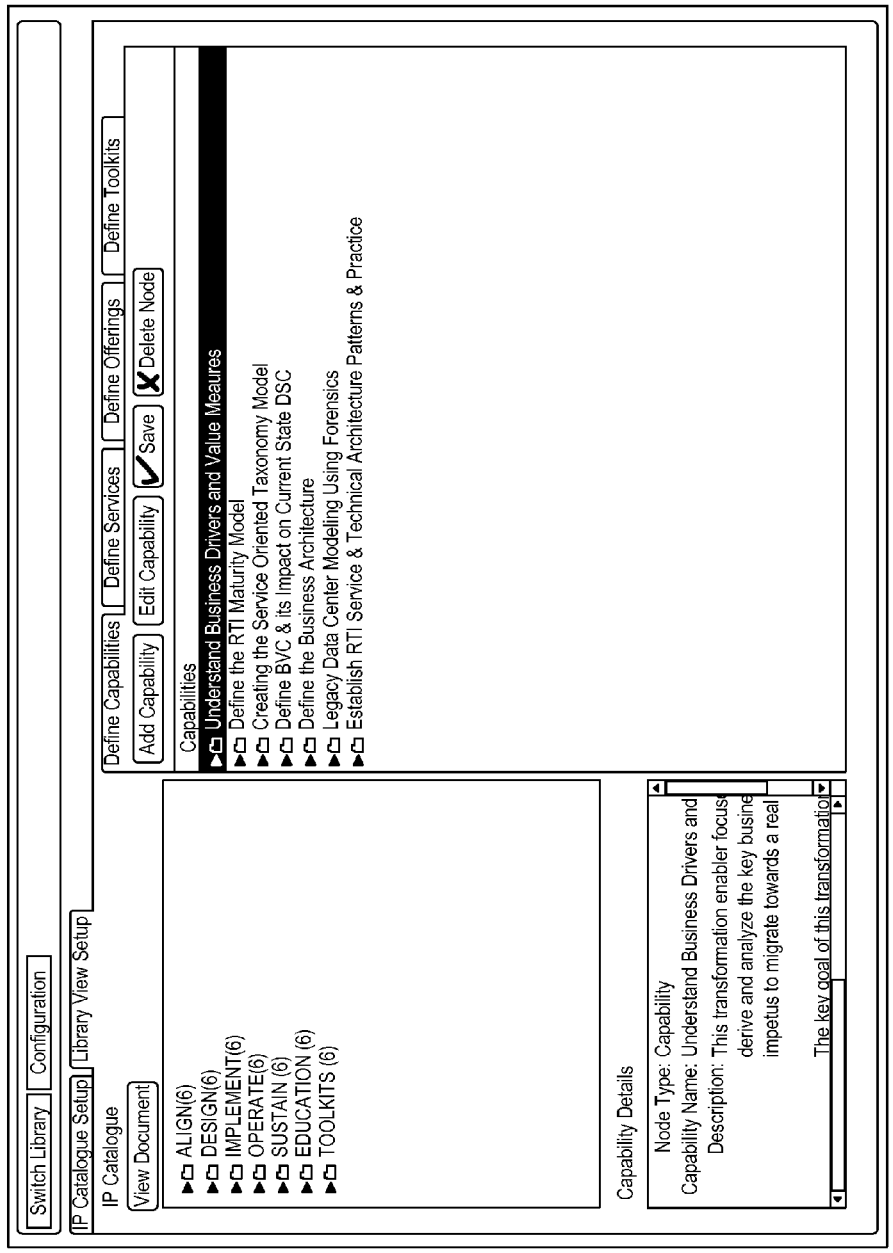
FIG. 13 is an exemplary depiction of the Library View Setup screen of FIG. 12 illustrating the management of "capabilities" in the knowledge base.

FIG. 13 is an exemplary depiction of the Library View Setup screen of FIG. 12 illustrating the management of "capabilities" in the knowledge base 12. The capabilities manager may be accessed via a selectable tab, labeled "Define Capabilities," visible along the top of the right panel. Once the capabilities manager is selected, a list of existing capabilities is listed in the right panel. Selectable options (accessible via selectable buttons that may be arranged, for example, along the top of the screen below the "Define Capabilities" tab) preferably include "Add Capability," "Edit Capability," "Save" and "Delete Node." New capabilities may be added by selecting the "Add Capability" button. Existing capabilities may be edited by selecting the "Edit Capability" button. Capabilities and/or the state of the tree may be saved by selecting the "Save" button. A particular capability and/or node can be deleted by selecting the "Delete Node" button. With regard to editing and deleting capabilities, a particular capability may be selected for such action for example by clicking on the desired capability in the list of capabilities. The particular capability selected in FIG. 13 is "Understand Business Drivers and Value Measures." Once a capability is selected, metadata for that capability is displayed in the lower left panel.

Figure 14:
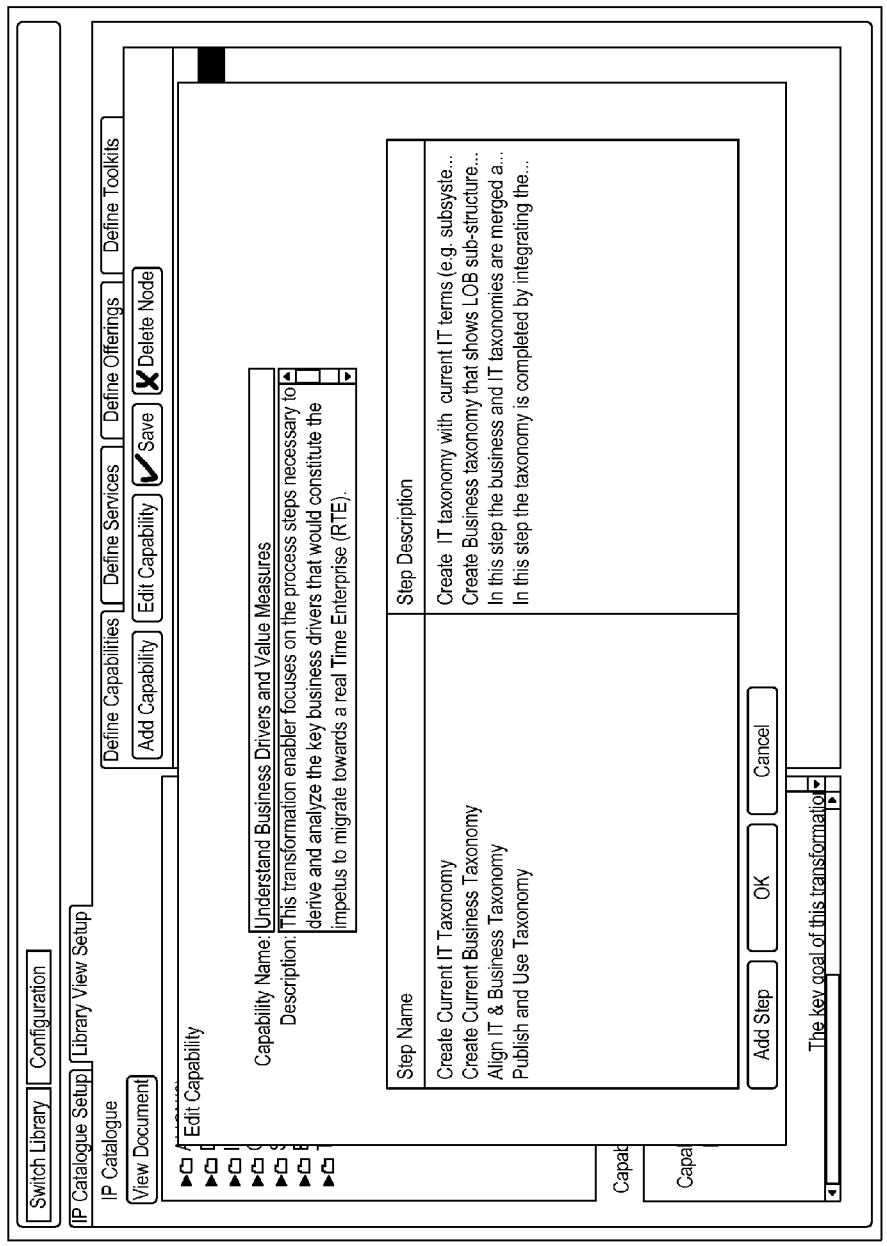
FIG. 14 is an exemplary depiction of the Library View Setup screen of FIG. 13 illustrating a "capabilities" editor.

FIG. 14 is an exemplary depiction of the Library View Setup screen of FIG. 13 illustrating a "capabilities" editor. Such an editor may, for example, be in the form of a window that is displayed in response to selection by a user of the "Edit Capability" button. A similar editor, but tailored for initial creation of a capability, may be displayed in response to selection by a user of the "Add Capability" button. The editor allows various fields to be entered or edited, including capability name, a description of the capability, and names and descriptions of any steps associated with the capability. In this regard, it is contemplated that each capability may include one or more steps, each of which includes a shorthand name and a longer description thereof. These steps are intended to provide guidance for a user as to how to carry out a particular capability; the capability itself is intended to be incorporated as a node in one or more customized trees. Because the number of steps involved in each capability is variable, means for adding additional steps is preferably provided. This may be provided, for example, in the form of a selectable "Add Step" button such as that shown at the bottom of the window.

Figure 15:
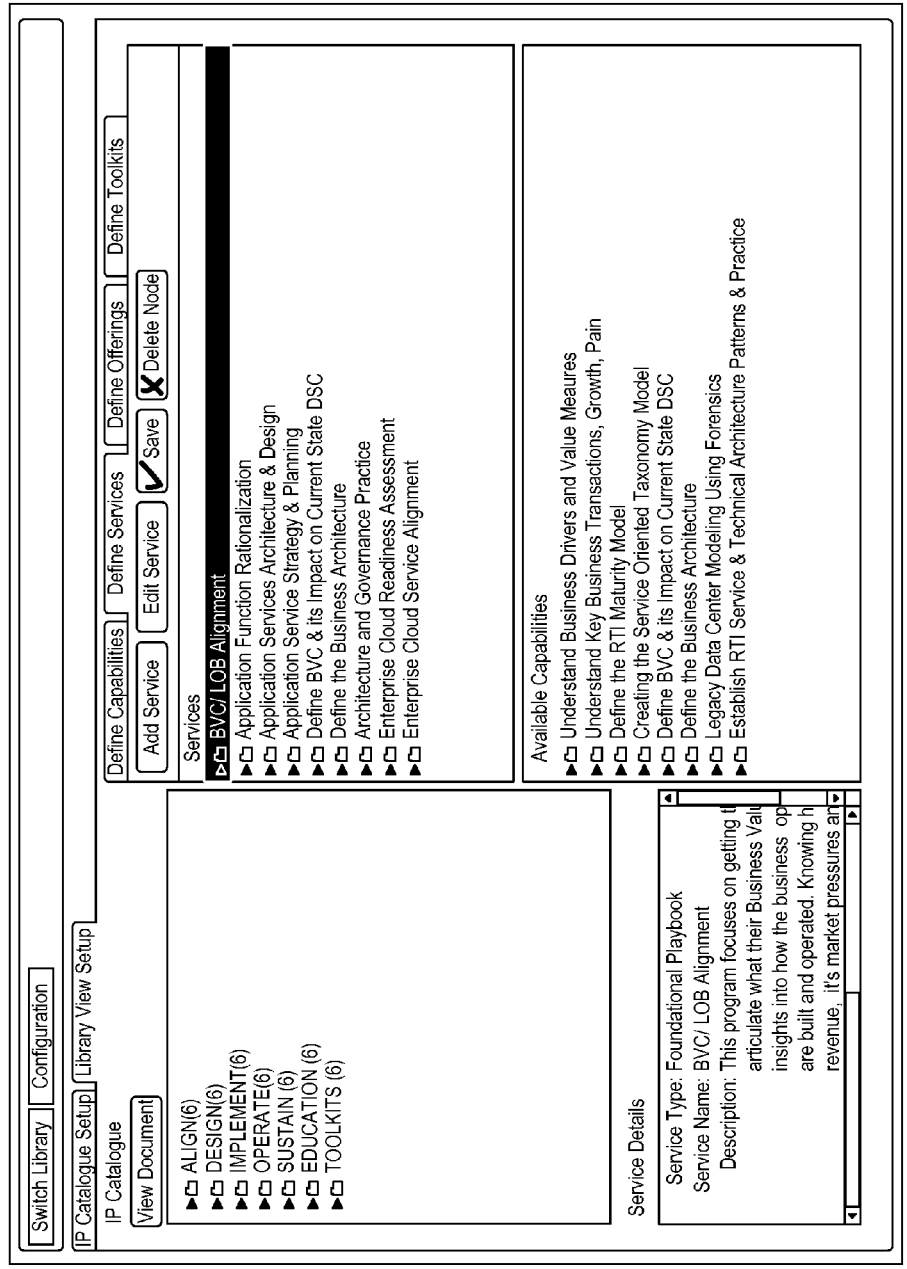
FIG. 15 is an exemplary depiction of the Library View Setup screen of FIG. 12 illustrating the management of "services" in the knowledge base.

FIG. 15 is an exemplary depiction of the Library View Setup screen of FIG. 12 illustrating the management of "services" in the knowledge base 12. The services manager may be accessed via a selectable tab, labeled "Define Services," visible along the top of the right panel. Once the services manager is selected, a list of existing services is listed in the top right panel. Selectable options (accessible via selectable buttons that may be arranged, for example, along the top of the screen below the "Define Services" tab) preferably include "Add Service," "Edit Service," "Save" and "Delete Node." New services may be added by selecting the "Add Service" button. Existing services may be edited by selecting the "Edit Service" button. Services and/or the state of the tree may be saved by selecting the "Save" button. A particular service and/or node can be deleted by selecting the "Delete Node" button. With regard to editing and deleting services, a particular service may be selected for such action for example by clicking on the desired service in the list of services. The particular service selected in FIG. 15 is "BVC/LOB Alignment." Once a service is selected, metadata for that service may be displayed in the lower left panel.

Also present in the Library View Setup screen of FIG. 15 is a panel, located in the lower right thereof, listing capabilities that have been defined and are available. Although not linked directly or specifically to any service, capabilities are often attached to as nodes branching from service nodes in the ADIOS program tree. Preferably, the capabilities in the list are selectable by a user such that upon selection, metadata about the selected capability is displayed in the lower left panel.

Figure 16:
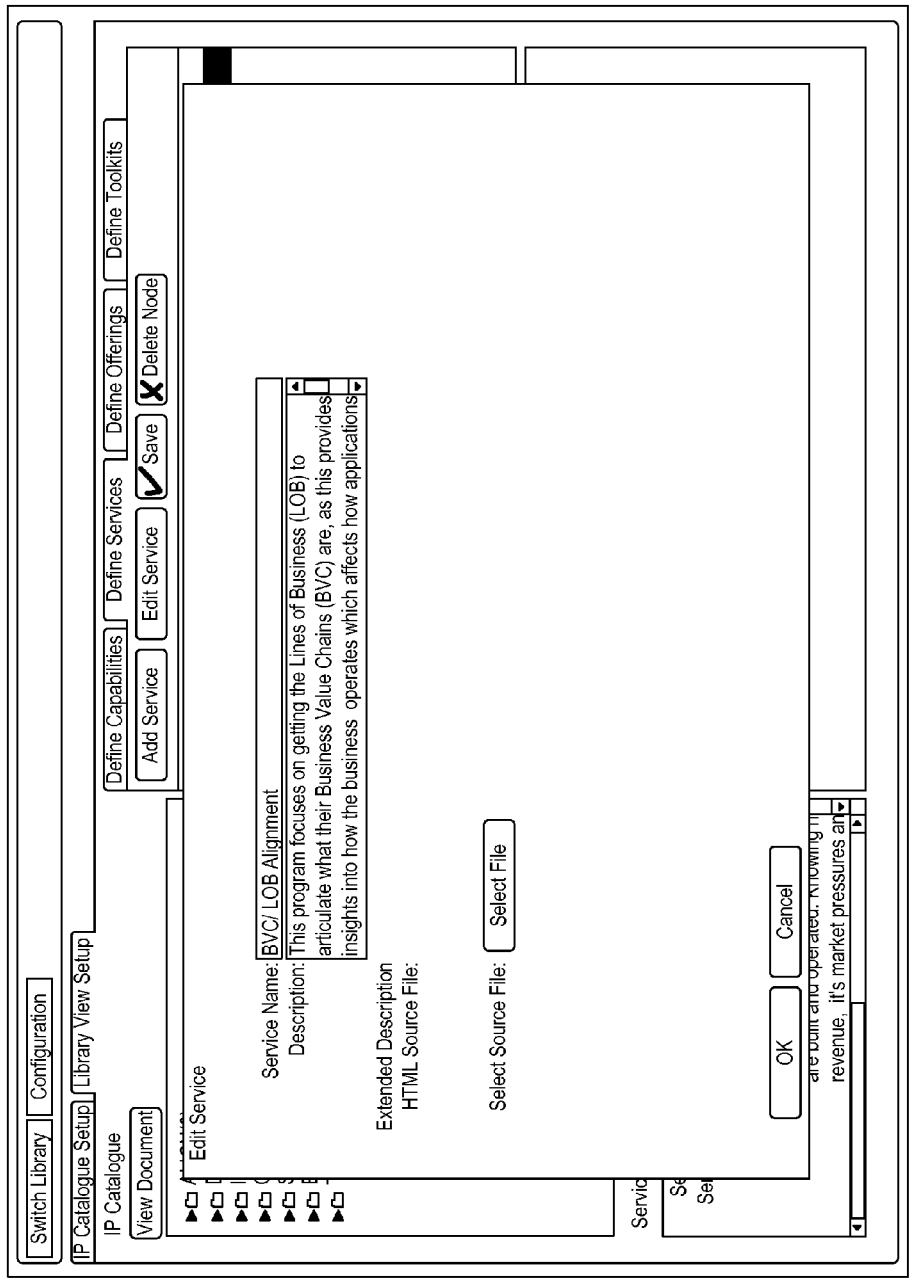
FIG. 16 is an exemplary depiction of the Library View Setup screen of FIG. 15 illustrating a "services" editor.

FIG. 16 is an exemplary depiction of the Library View Setup screen of FIG. 15 illustrating a "services" editor. Such an editor may, for example, be in the form of a window that is displayed in response to selection by a user of the "Edit Service" button. A similar editor, but tailored for initial creation of a service, may be displayed in response to selection by a user of the "Add Service" button. The editor allows various fields to be entered or edited, including service name, a description of the service, and a description of a computer-readable file associated with the service. In this regard, it is contemplated that each service may have a document, providing useful information regarding the service to the user, associated therewith. A particular computer-readable file representing the document may be linked by identifying it; this may preferably be accomplished, for example, via a selectable "Select File" button such as that shown in the middle of the window. Using such a button, a user may use the a standard utility to maneuver to, and link, the appropriate computer-readable file for subsequent use with the service and all usages of the service in any program tree.

Figure 17:
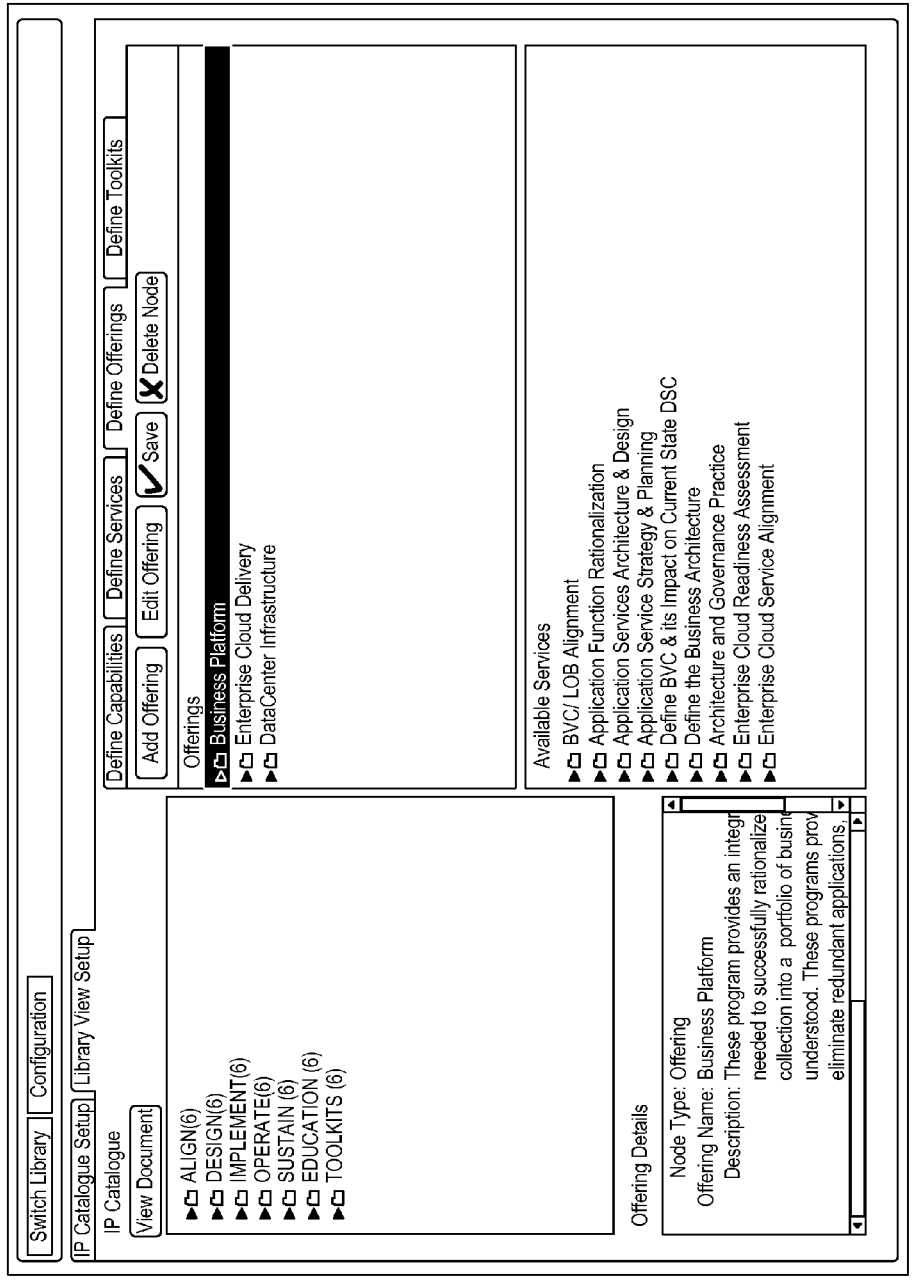
FIG. 17 is an exemplary depiction of the Library View Setup screen of FIG. 12 illustrating the management of "offerings" in the knowledge base.

FIG. 17 is an exemplary depiction of the Library View Setup screen of FIG. 12 illustrating the management of "offerings" in the knowledge base 12. The offerings manager may be accessed via a selectable tab, labeled "Define Offerings," visible along the top of the right panel. Once the offerings manager is selected, a list of existing offerings is listed in the top right panel. Selectable options (accessible via selectable buttons that may be arranged, for example, along the top of the screen below the "Define Offerings" tab) preferably include "Add Offering," "Edit Offering," "Save" and "Delete Node." New offerings may be added by selecting the "Add Offering" button. Existing offerings may be edited by selecting the "Edit Offering" button. Offerings and/or the state of the tree may be saved by selecting the "Save" button. A particular offering and/or node can be deleted by selecting the "Delete Node" button. With regard to editing and deleting offerings, a particular offering may be selected for such action for example by clicking on the desired offering in the list of offerings. The particular offering selected in FIG. 17 is "Business Platform." Once an offering is selected, metadata for that offering may be displayed in the lower left panel.

Also present in the Library View Setup screen of FIG. 17 is a panel, located in the lower right thereof, listing services that have been defined and are available. Although not linked directly or specifically to any offering, services are often attached to as nodes branching from offering nodes in the ADIOS program tree. Preferably, the services in the list are selectable by a user such that upon selection, metadata about the selected service is displayed in the lower left panel.

Figure 18:
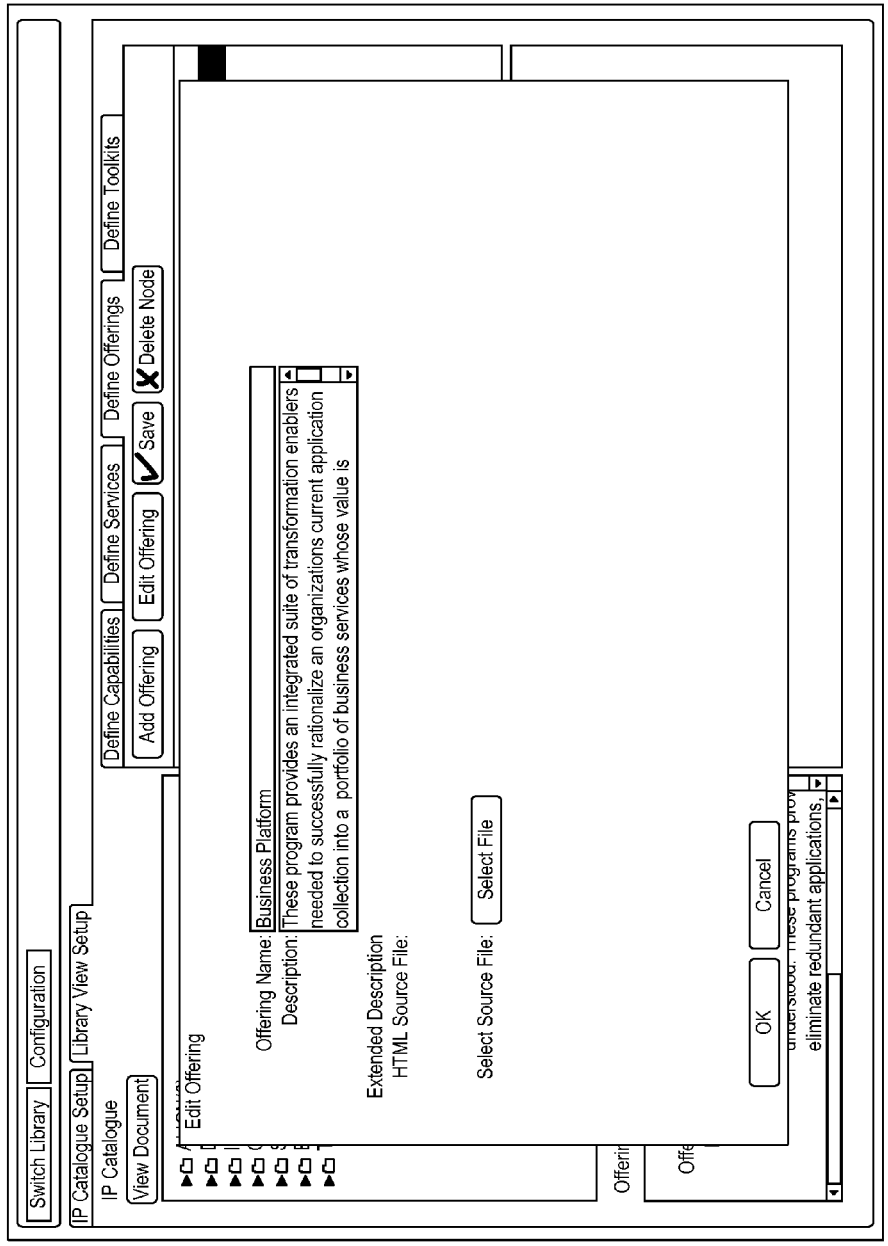
FIG. 18 is an exemplary depiction of the Library View Setup screen of FIG. 15 illustrating an "offerings" editor.

FIG. 18 is an exemplary depiction of the Library View Setup screen of FIG. 15 illustrating an "offerings" editor. Such an editor may, for example, be in the form of a window that is displayed in response to selection by a user of the "Edit Offering" button. A similar editor, but tailored for initial creation of an offering, may be displayed in response to selection by a user of the "Add Offering" button. The editor allows various fields to be entered or edited, including offering name, a description of the offering, and a description of a computer-readable file associated with the offering. In this regard, it is contemplated that each offering may have one or more documents, providing useful information regarding the offering to the user, associated therewith. A particular computer-readable file representing each document may be linked by identifying it; this may preferably be accomplished, for example, via a selectable "Select File" button such as that shown in the middle of the window. Using such a button, a user may use the a standard utility to maneuver to, and link, the appropriate computer-readable file for subsequent use with the offering and all usages of the offering in any program tree.

Figure 19:
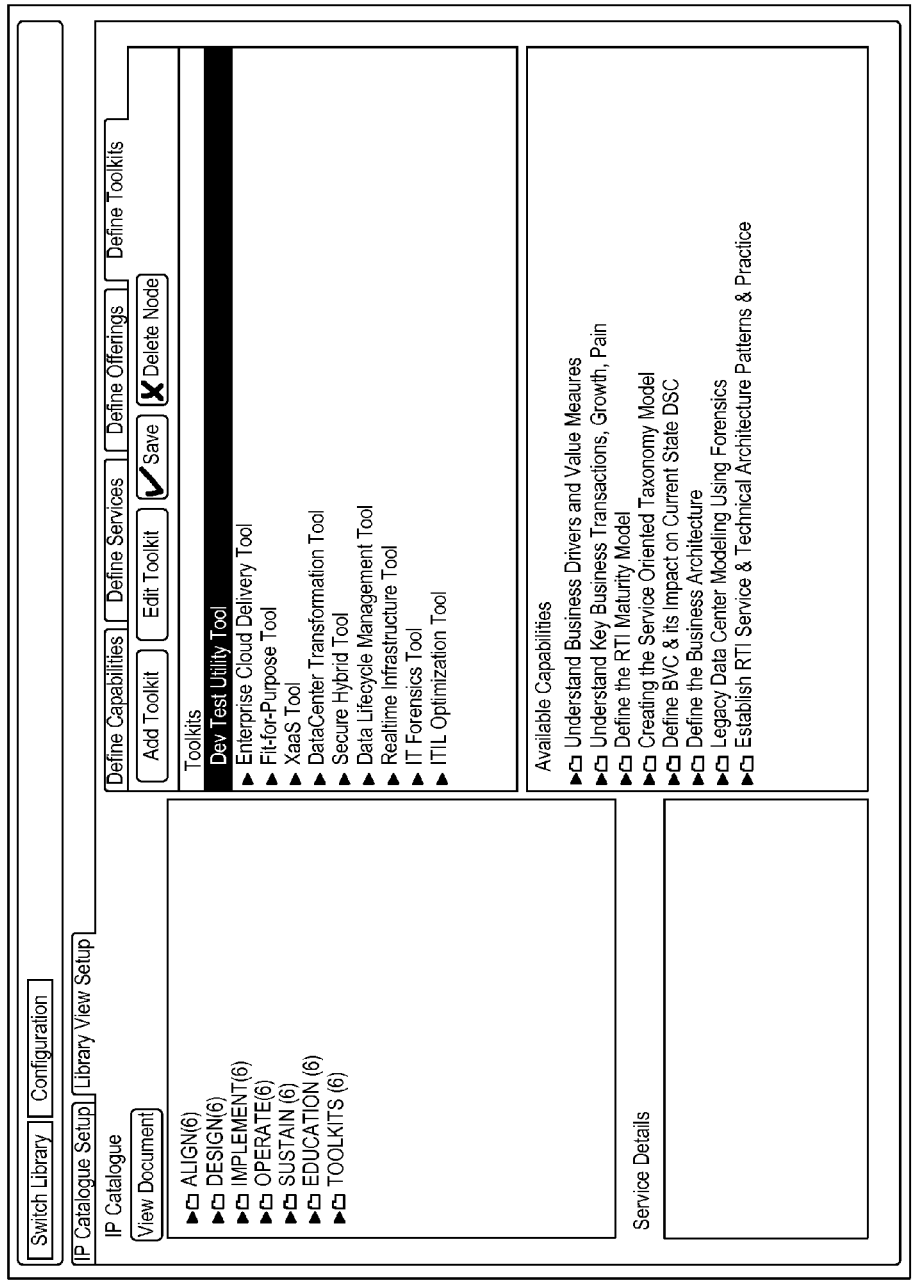
FIG. 19 is an exemplary depiction of the Library View Setup screen of FIG. 12 illustrating the management of "toolkits" in the knowledge base.

FIG. 19 is an exemplary depiction of the Library View Setup screen of FIG. 12 illustrating the management of "toolkits" in the knowledge base 12. The toolkit manager may be accessed via a selectable tab, labeled "Define Toolkits," visible along the top of the right panel. The toolkits manager may be accessed via a selectable tab, labeled "Define Services," visible along the top of the right panel. Once the toolkits manager is selected, a list of existing toolkits is listed in the top right panel. Selectable options (accessible via selectable buttons that may be arranged, for example, along the top of the screen below the "Define Toolkits" tab) preferably include "Add Toolkit," "Edit Toolkit," "Save" and "Delete Node." New toolkits may be added by selecting the "Add Toolkit" button. Existing toolkits may be edited by selecting the "Edit Toolkit" button. Toolkits and/or the state of the tree may be saved by selecting the "Save" button. A particular toolkit and/or node can be deleted by selecting the "Delete Node" button. With regard to editing and deleting toolkit, a particular toolkit may be selected for such action for example by clicking on the desired toolkit in the list of toolkits. The particular toolkit selected in FIG. 19 is "Dev Test Utility Tool." Once a toolkit is selected, metadata for that toolkit may be displayed in the lower left panel.

Also present in the Library View Setup screen of FIG. 19 is a panel, located in the lower right thereof, listing capabilities that have been defined and are available. Although not linked directly or specifically to any toolkit, capabilities are often attached to as nodes branching from toolkit nodes in the ADIOS program tree. Preferably, the capabilities in the list are selectable by a user such that upon selection, metadata about the selected capability is displayed in the lower left panel.

Although not illustrated, other modules may be provided as well. For example, in at least one embodiment, a reports module is provided to allow the running of reports to identify document gaps in both the IP Catalogue and the Library. For example, an "orphans" report may identify all IP Catalogue items that are not attached to any Library Nodes. The same or similar report may identify all IP types (how-to, etc.) that are not attached to any IP. Still further, a "gap analysis" report may identify Library nodes that have no IP Catalogue items attached, and IP Catalogue items that have no doc2doc relationships, i.e. how-to, source, etc.

Still further, in at least one embodiment, a help module is provided to present help files and how-to information regarding the operation of the application.

In one contemplated commercial embodiment, the application may be based on a conventional Model-View-Controller pattern to implement software separation. Successful use of the pattern isolates business logic from user interface considerations, resulting in an application where it is easier to modify either the visual appearance of the application or the underlying business rules without affecting the other. In MVC, the model represents the information (the data) of the application and the business rules used to manipulate the data; the view corresponds to elements of the user interface such as text, checkbox items, and so forth; and the controller manages details involving the communication to the model of user actions such as keystrokes and mouse movements.

In one contemplated commercial embodiment, the application will operate in any computer operating system supported by Adobe Air Runtime. Further, the application may be released in different forms, including successive versions.

In one implementation, a product embodying the present inventions may be delivered as a local product (online, CD or DVD) using XML configuration and file storage on the file system (local disk or network share). User authorization manages the access to functional capabilities to prevent non-administrators from altering core data relationships. The application may developed using the Adobe Flex Framework, and the executable target may be run using the Adobe AIR runtime engine.

In another implementation, a product embodying the present invention may be delivered as a local product (online, CD or DVD) using a persistent data remoting model that replaces most or all XML configuration files, providing the user with the various access levels in a transaction-safe environment. File storage preferably supports both the file system and a server-based data repository. The application may continue to be developed on the Flex Framework and may leverage features of the Adobe LiveCycle platform for content storage and management. The application may still be using some XML configuration files, but the primary data repository is preferably a SQL92 Compliant DBMS. The application may use the DBMS for data storage only (i.e. not content) but preferably does not use stored procedures or functions to devolve logic to the database layer, thereby providing the flexibility to allow a non-SaaS (behind the firewall) deployment if so required. The application components may be deployed on application servers that are J2EE specification compliant. For other implementations, no application server may be needed. Certain components may be deployed on web servers that are HTTP/1.1 specification compliant. For other implementations, no webserver may be needed.

In at least some implementations, the application may be a Rich Internet Application (RIA) developed on the Adobe Flex platform and deployed using the Adobe AIR runtime. This will allow for a highly interactive and immersive user experience ensuring easier adoption.

User Experience

Library Viewer for Consumer

Figure 20:
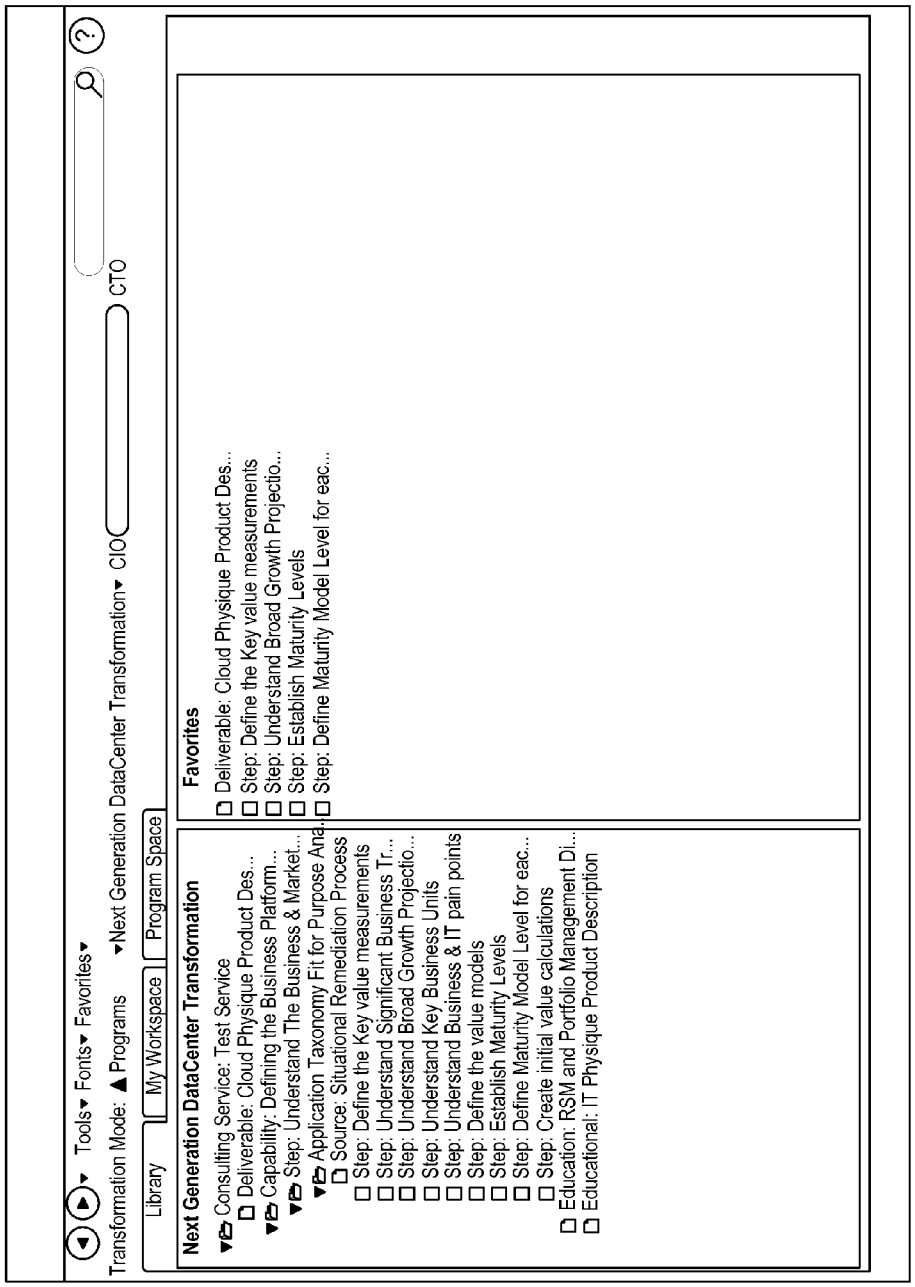
FIG. 20 is an exemplary depiction of a navigational screen of a user interface for consumers viewing or accessing the knowledge base in accordance with one or more preferred embodiments of the present invention.

FIG. 20 is an exemplary depiction of a first navigational screen of a user interface 22 for consumers viewing or accessing the knowledge base 12 via a customized library platform 16 in accordance with one or more preferred embodiments of the present invention. This screen is preferably tailored for a particular targeted consumer using the knowledge base manager. FIG. 20 provides an exemplary panel for how to navigate through the knowledge base 12, based on the level of Program definition. It offers up the content without the need for Process Genus definitions. It also permits the "grazing" to discover the most likely Pattern for the known Qualities. It will be apparent, however, that other interfaces may alternatively be provided.

Figure 21:
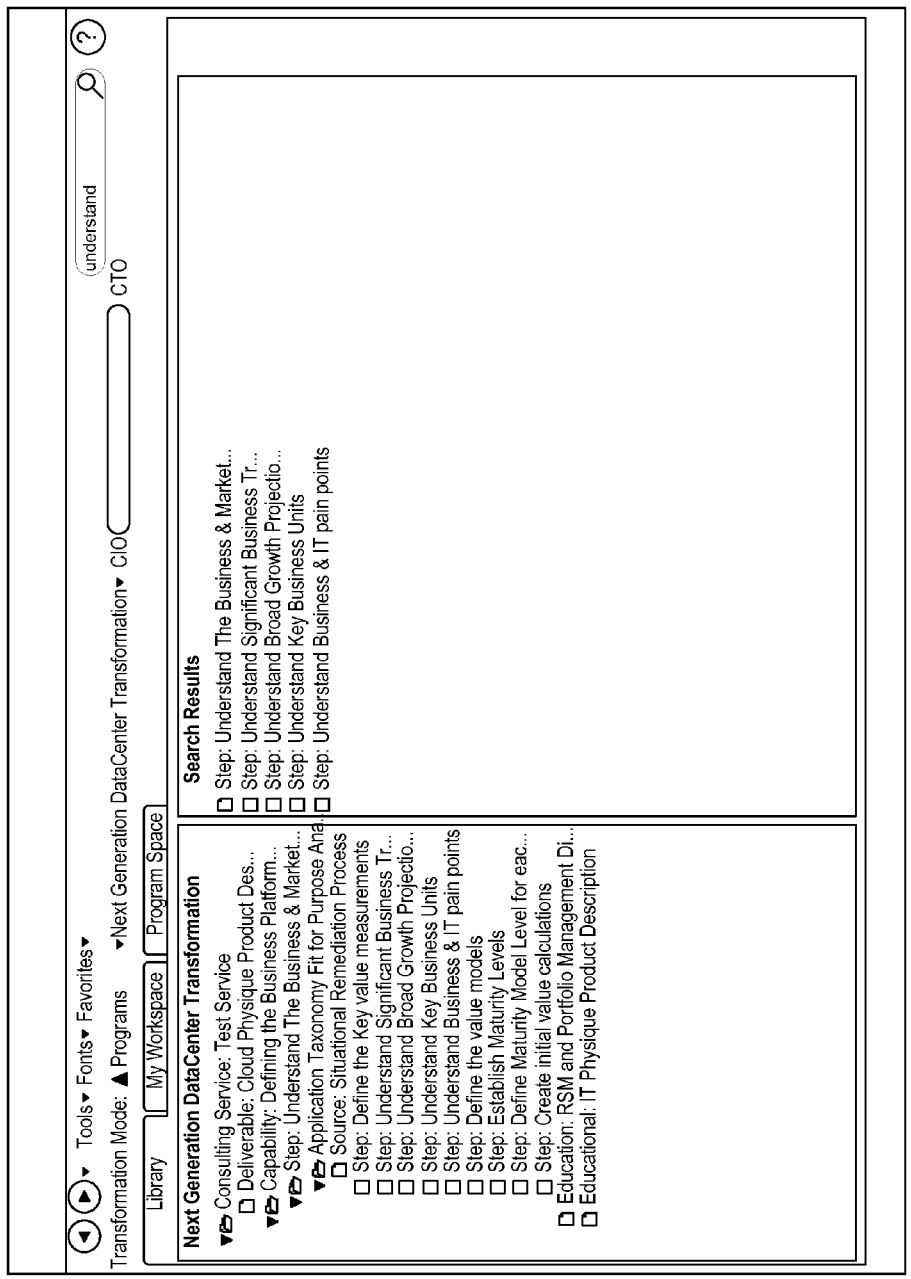
FIG. 21 is an exemplary depiction of a search screen of a user interface for consumers viewing or accessing the knowledge base in accordance with one or more preferred embodiments of the present invention.
Figure 22A:
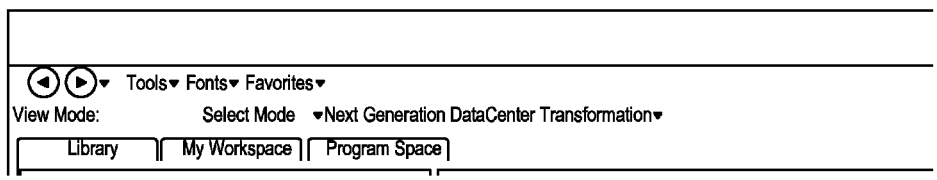
FIGS. 22A-22D are exemplary depictions of portions of various alternative navigation screens of a user interface for consumers viewing or accessing the knowledge base in accordance with one or more preferred embodiments of the present invention.
Figure 22B:
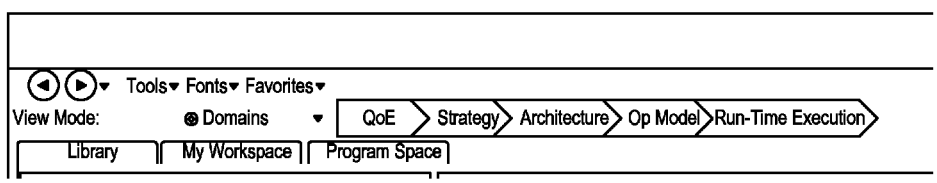
Figure 22C:
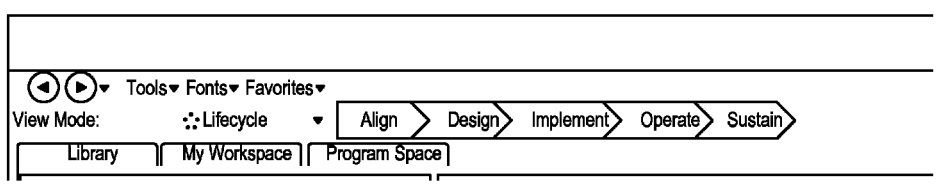
Figure 22D:
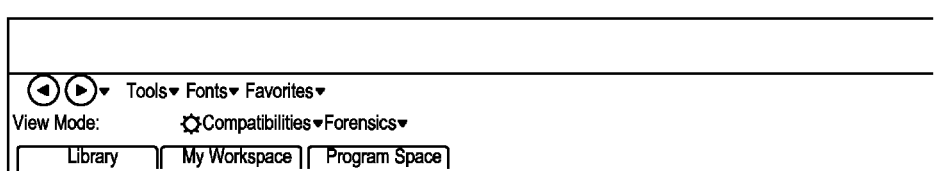

FIG. 21 is an exemplary depiction of a search screen of a user interface 22 for consumers viewing or accessing the knowledge base 12 via a customized library platform 16 in accordance with one or more preferred embodiments of the present invention. As illustrated therein, a search panel is made available to locate relevant information, based on keyword matching.

FIG. 21 expresses the ways that a search of the knowledge base 12 can be performed. Examples would be searches for Architecture or Testing documentation that are appropriate for many Pattern Genus or generalized project manage reference materials. Some topics, such as Service Level definitions transcend all Genus, so can be found through this kind of query against the System.

FIGS. 22A-22D are exemplary depictions of portions of various alternative navigation screens of a user interface 22 for consumers viewing or accessing the knowledge base 12 in accordance with one or more preferred embodiments of the present invention. In particular, FIGS. 22A-22D illustrate different control panels or navigational views that may be offered to a user 26,28,30 to permit him or her to navigate the available information in different ways. Included in FIG. 22C, for example, is the Program life cycle 101, which decomposes into the ADIOS components 102,103,104,105, 106. Other control panels or navigational views may likewise be provided to aid various users 26,28,30 in navigating and understanding the information. The various control panels or navigational views shown in FIGS. 22A-22D, as well as that shown in FIG. 20, can optionally be reached by selecting a particular view mode (sometimes referred to as a transformation mode) from a selectable list (e.g., available via drop-down menu) of modes.

FIG. 25 is an exemplary depiction of still another navigational screen of a user interface 22 for consumers viewing or accessing the knowledge base 12 via a customized library platform 16 in accordance with one or more preferred embodiments of the present invention. In particular, this navigational screen provides consumers 24 with an interactive "storyboard" experience for navigating through their respective library platform 16. Such a storyboard navigational screen presents written dialog describing each of several different situations, areas of interest, life cycle phases, or other subject matter category; preferably, multiple subject matter categories are presented with multiple options in each category, with dialog describing each. When any one of the categories is selected, further information associated with the category may be presented to the user 24, further choices may be offered, and the like. When a sufficiently granular level of information is reached, specific items from the customized platform 16 are made available for selection by and presentation to the user. Thus, the consumer 24 may access the customized library platform 16 at a variety of entry points; further, the consumer 24 is more easily able to find a suitable entry point based on his particular point of view. In other words, a consumer 24 is able to self-select his entry point to the customized library platform 16 by exploring a category of his choice and the options available within the selected category.

In the particular navigational screen of FIG. 25, three categories are presented: transformational tools, transformational programs and transformational enablers. Three choices are offered under the category of transformational tools: industry verticals, accelerators and optimizers; three choices are offered under the category of transformational programs: business platform, enterprise cloud delivery and datacenter infrastructure; and four choices are offered under the category of transformational enablers: align, design, implement and operate. Selection of any of the choices in any of the categories may result in the presentation to the user of further information relevant to the particular subject matter and a choice, preferably at least in list form, of additional options, such as IP elements from the library platform 16 that may be available for review and use.

Figure 26:
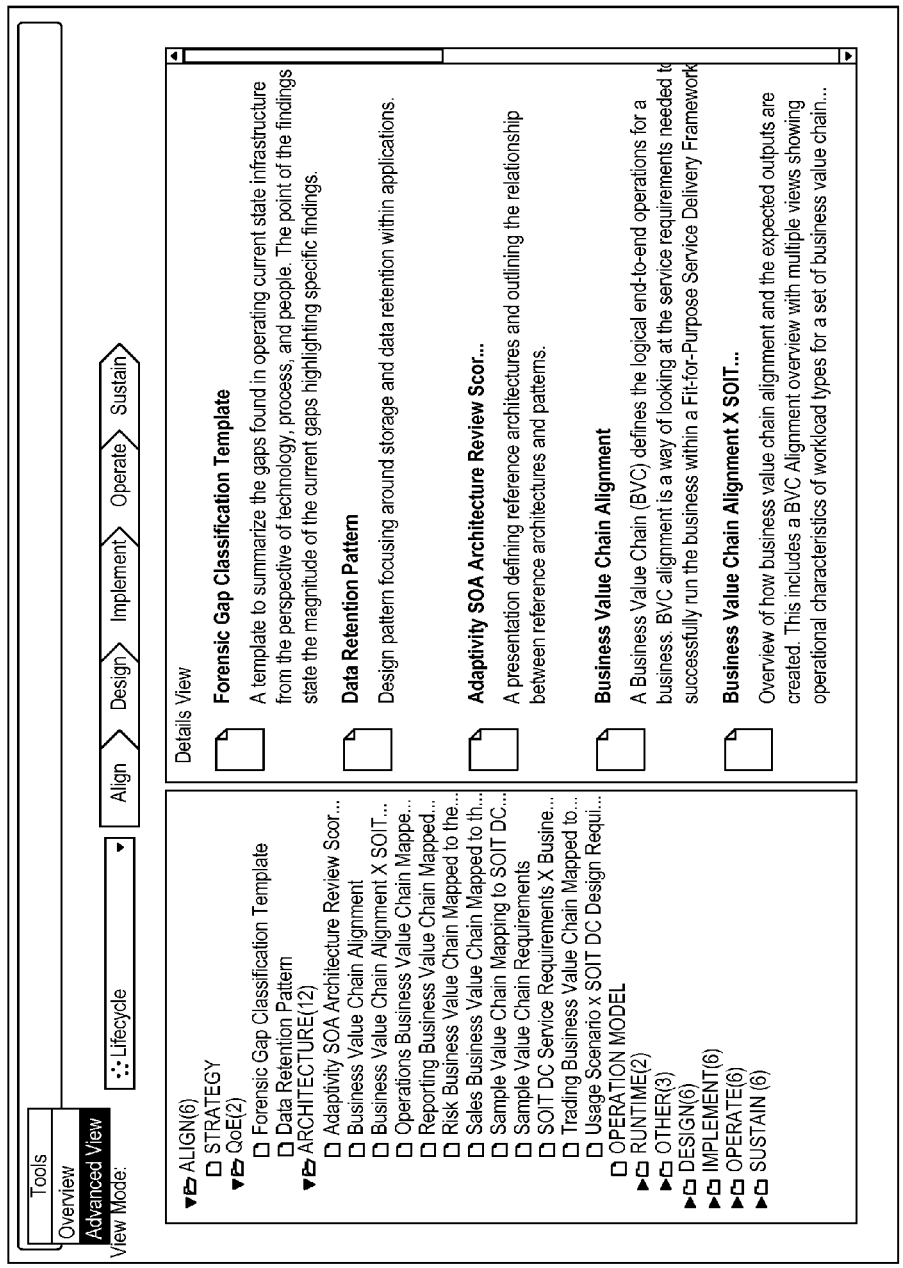
FIG. 26 is an exemplary depiction of still another navigational screen of a user interface for consumers viewing or accessing the knowledge base via a customized library platform in accordance with one or more preferred embodiments of the present invention.

Of note, FIG. 25 illustrates the selection, via drop-down menu in the upper lefthand corner, of a particular tool view or tool set, namely, "Overview." However, one or more alternative tool views or tool sets may likewise be offered. In this regard, FIG. 26 is an exemplary depiction of still another navigational screen of a user interface 22 for consumers viewing or accessing the knowledge base 12 via a customized library platform 16 in accordance with one or more preferred embodiments of the present invention. In particular, the navigational screen of FIG. 26 offers the consumer 24 a tool view or tool set named "Advanced View," in which a library tree, somewhat similar in form to those described previously with reference to FIGS. 9, 20 et al., is presented in a left panel and storyboard information (in the form of written dialog) about the various nodes (IP elements 17) is provided in the right panel.

Figure 27A:
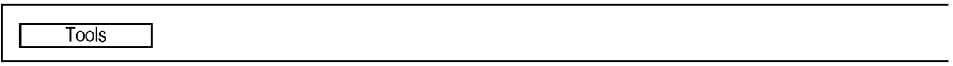
FIGS. 27A-27E are exemplary depictions of portions of various alternative navigation screens of a user interface for consumers viewing or accessing the knowledge base in accordance with one or more preferred embodiments of the present invention.
Figure 27B:
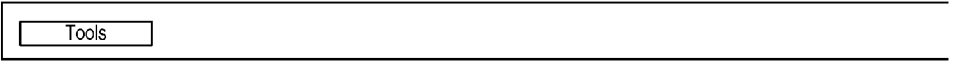
Figure 27C:
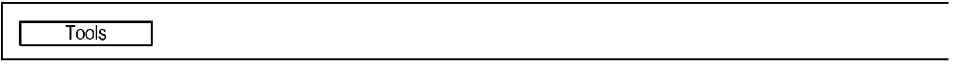
Figure 27D:
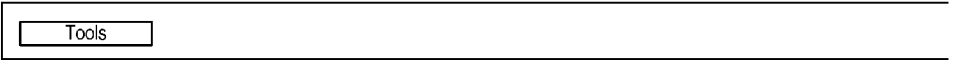
Figure 27E:

Of note, FIG. 26 illustrates a particular view mode with the "Advanced View" tool view or tool set, namely, "Lifecycle." In conjunction with this view mode, the Program life cycle 101, which decomposes into the ADIOS components 102, 103,104,105,106, is displayed to the right of what may be a drop-down menu of various view modes. Other view modes are likewise contemplated. For example, FIGS. 27A-27E are exemplary depictions of portions of various alternative navigation screens of a user interface 22 for consumers 24 viewing or accessing the knowledge base 12 in accordance with one or more preferred embodiments of the present invention. In particular, FIGS. 27A-27E illustrate different view modes that may be offered to a user 26,28,30 to permit him or her to navigate the available information in different ways. Included in FIG. 27A, for example, is a particular program view pertaining to DataCenter Infrastructure; subcategories or particular IP elements 17 related to this program (including an IP element named "DataCenter Transformation Readiness Assessment") could be selected, for example, from a drop-down menu to the right thereof. Other programs could include "Business Platform" and "Enterprise Cloud Delivery." Included in FIG. 27B is a "Tools" view; subcategories or particular IP elements 17 related to this program (including an IP element named "Dev Test Utility Tool") could be selected, for example, from a drop-down menu to the right thereof. Included in FIG. 27C is a "Domains" view; subcategories related to this program (including subcategories, pertaining to an IT domain evolution, named "QoE," "Strategy," "Architecture," "Op Model" and "Run-Time Execution") could be selected, for example, from a set of buttons to the right thereof. Included in FIG. 27D is a "Transformation Enablers" view; subcategories or particular IP elements 17 related to this program (including an IP element named "Understanding Business Drivers and Value Measures") could be selected, for example, from a drop-down menu to the right thereof. Included in FIG. 27E is a "Categories" view; when selected, a sorted list of all IP elements 17 may be made available to the consumer 24.

Relationship to Other Tools and Processes

In at least some embodiments, one or more elements of the system 10 of the present invention, and aspects thereof, are combined with other tools, processes, and elements to provide more a comprehensive approach to the development and deployment of a Business Application. For example, as noted previously, a tool implementing the system 10 of the present invention could be combined with a tool for the best practice deployment recommendations and a tool for the data aggregation on the actual operational measurements.

Figure 23:
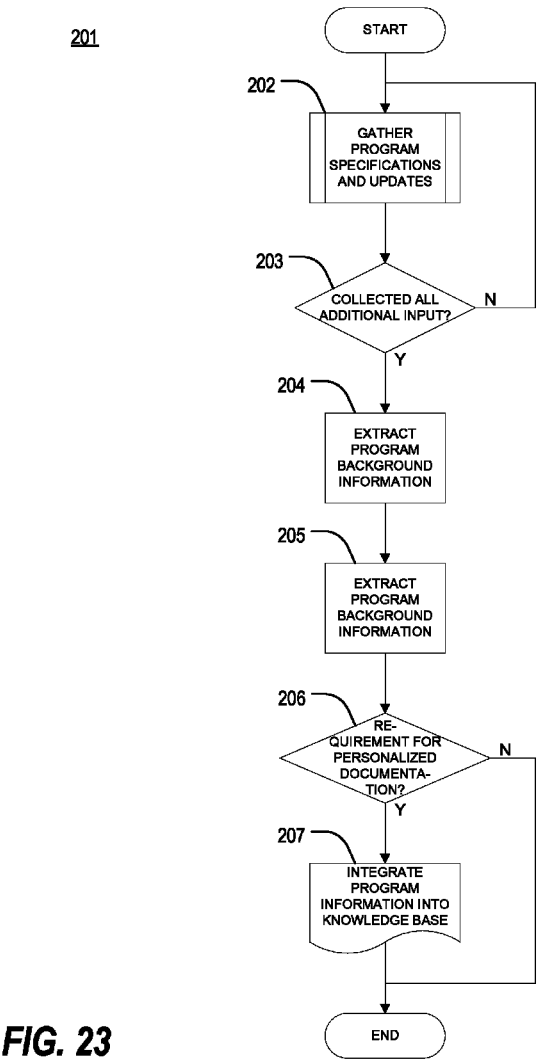
FIG. 23 is a flowchart representation of a generalized user experience process, for the customized library designer or developer, in accordance with one or more preferred embodiments of the present invention.

FIG. 23 is a flowchart representation of a generalized Business Application development and deployment process 201 in accordance with one or more preferred embodiments of the present invention. This sequence is preferably started by a person, such as the consumer, who has additional information about the Program or Business Application. Through interaction with a user interface additional (or updated) information is acquired. All the new data is acquired in a sub-process 202 until all changes have been identified. Defining a new Program may be considered an update.

Specifically in the Design phase of the ADIOS life cycle model 101, the algorithmic transformation of Program parameters, which have been gathered or entered by the consumer using an appropriate system, and preferably stored in an appropriate database thereof, is described in FIG. 23. After initializing such a system, of which the system 10 of the present invention may form a part, the user would be authenticated, associated with a name that represents the Program, and authorization checked (to ensure access is permitted). At 202, the consumer would identify the Program (Business Application) being referenced, and then update parameters as appropriate (see FIG. 24). Gathering prior information in 204, the collection of Pattern data would be collated. The result of the updates would identify addition information that would be relevant to the Program deployment (all segments of the life cycle, including architecture, design, implementation, verification and operations). In 206, the user decides on what relevant reports apply to this Program, and is given the choice of retrieving or printing the document. In 207, the customized or personalized information is made available via the knowledge base 12 and, in some embodiments, other elements of the system 10 of the present invention.

Figure 24:
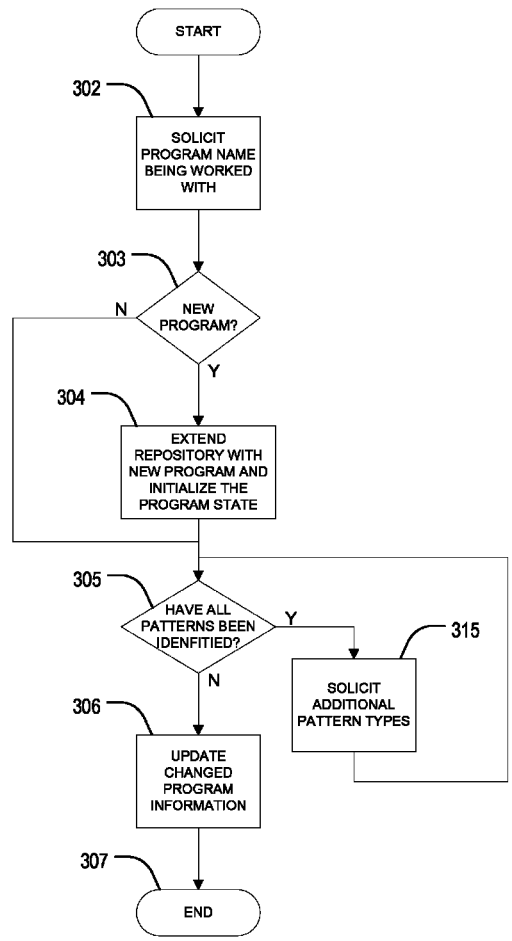
FIG. 24 is a flowchart representation of a subprocess in the generalized user experience process of FIG. 23.

FIG. 24 is a flowchart representation of a subprocess 202 in the generalized process 201 of FIG. 23. More particularly, FIG. 24 illustrates logic to acquire additional Program information, to define, refine or update the characteristics of the Program. The interrogation in step 302 is intended to gather more information about the Program that is intended to be the final deliverable. Step 303 permits the creation of a new program, occurring at step 304, which starts without function and requires at least one Pattern Genus or type before it can be retained for future reference. Step 305 validates that a Pattern Genus has been identified, and if appropriate the other associated attributes to create a well formed Pattern reference. If the process of creating additional Pattern Genera is not yet complete, they may be solicited and/or identified at step 315. Often, the information provided is an elaboration of an existing Program. In this case, the Pattern Genus that extends the Program provides the basic selection criteria. With only Genus known, the Align phase 102 is identified, and the information in the knowledge base is constrained to the segment relating to Align 102. In step 306, the updated or new information is retained in the system for future access, interrogation and alternation.

One type of output of a process 201 such as that depicted in FIG. 2 is an IT blueprint. As used herein, "blueprints" are documents and materials that represent the "heart and soul" of a particular transformation and are a combination of reference architectures and design patterns that together allow a business to build services with the right flexibility and growth points. In at least some embodiments, these blueprints may be built from a top-down design perspective and as a result drive true business-IT alignment, while in some they may be built using a bottom-up, supply-side perspective via current state modeling. These architecture and design patterns are abstract definitions of functionality that often are industry or platform independent models that reflect business requirements. Because they are reusable functionality, they are less volatile and more stable. They are optimized to business application workload performance while balancing the need to be very IT efficient. The blueprints are clearly and sufficiently documented so that parameters of execution can be understood by both the IT provider and consumer.

In at least some embodiments, a comprehensive system, to which the system 10 of the present invention may serve as an adjunct, may include a tool corresponding to each segment in the five-segment life cycle model of FIG. 4. For example, a modeling studio tool may be provided to facilitate the Align phase 102, a design studio tool may be provided to facilitate the Design phase 103, a life cycle manager tool may be provided to facilitate the Integrate phase 104, a forensics and/or discovery studio tool may be provided to facilitate the Operate phase 105, and a governance studio tool may be provided to facilitate the Sustain phase 106. Furthermore, in at least some embodiments, information may be interchanged between the various tools to deliver a seamless toolkit for users. Suitable tools for these purposes are available from Adaptivity, Inc. of Charlotte, N.C.

Based on the foregoing information, it will be readily understood by those persons skilled in the art that the present invention is susceptible of broad utility and application. Many embodiments and adaptations of the present invention other than those specifically described herein, as well as many variations, modifications, and equivalent arrangements, will be apparent from or reasonably suggested by the present invention and the foregoing descriptions thereof, without departing from the substance or scope of the present invention.

Accordingly, while the present invention has been described herein in detail in relation to one or more preferred embodiments, it is to be understood that this disclosure is only illustrative and exemplary of the present invention and is made merely for the purpose of providing a full and enabling disclosure of the invention. The foregoing disclosure is not intended to be construed to limit the present invention or otherwise exclude any such other embodiments, adaptations, variations, modifications or equivalent arrangements; the present invention being limited only by the claims appended hereto and the equivalents thereof.

What is claimed is:

1. A method for providing a library platform, customized for use by a particular customer, of informational elements that each pertain to one or more of information technology analysis, modeling, design and management, comprising:

(a) creating a non-customized knowledge base, arranged in the form of discrete informational elements that each incorporate intellectual property describing an aspect of information technology analysis, modeling, design and/or management; in a data store, wherein information technology includes at least one element selected from the group comprising computer equipment, computer systems, computer processes, and computer infrastructure which support business activities within a company or other organization;

(b) defining a high-level framework in which a plurality of the discrete informational elements may be arranged;

(c) presenting an unpopulated data tree, having data connection points established according to the high-level framework, to a first user via a user interface implemented on a computer;

(d) in conjunction with presentation of the unpopulated data tree, presenting the informational elements of the knowledge base to the first user for customized selection and placement thereof on the tree, wherein selection and placement is based on characteristics, known to the first user, about an information technology system of a particular customer;

(e) in response to selection of a particular informational element, by the first user, from the knowledge base, facilitating the attachment of the selected informational element at a data connection point on the tree, thereby forming a tree node, such that the high-level framework provides semantic context for the selected informational element;

(f) presenting the updated tree to the first user;

(g) iteratively repeating steps (d), (e) and (f) until a library platform, comprising a fully-populated tree that is customized for use by the particular customer, is completed; and (h) providing the completed library platform to the particular customer for use in one or more of designing, analysis, modeling and managing the information technology system of the customer, wherein the completed library platform includes a blueprint comprising a reference architecture and design pattern which define functionality and represent business requirements, wherein the blueprint enables an information technology transformation of the information technology by providing tailored transformation information.

2. The method of claim 1, wherein providing the completed library platform to the particular customer includes presenting the completed library platform to a user, designated by the customer, via a user interface implemented on a computer.

3. The method of claim 2, wherein the steps (d), (e) and (f) are carried out via a first user interface and step (h) is carried out via a second user interface.

4. The method of claim 1, wherein creating the non-customized knowledge base includes incorporating at least twenty discrete informational problem domain elements in the arrangement.

5. The method of claim 4, wherein creating the non-customized knowledge base includes incorporating at least 200 discrete informational problem domain elements in the arrangement.

6. The method of claim 4, wherein creating the non-customized knowledge base includes incorporating a plurality of discrete informational support elements in the arrangement for each of a majority of the problem domain elements.

7. The method of claim 6, wherein creating the non-customized knowledge base includes incorporating an average of at least three discrete informational support elements in the arrangement for each of the problem domain elements.

8. The method of claim 1, wherein creating the non-customized knowledge base includes incorporating informational elements of different types.

9. The method of claim 8, wherein at least some of the discrete informational elements are playbooks.

10. The method of claim 8, wherein at least some of the discrete informational elements are documents.

11. The method of claim 8, wherein at least some of the discrete informational elements are toolkits.

12. The method of claim 8, wherein at least some of the discrete informational elements are templates.

13. The method of claim 8, wherein at least some of the discrete informational elements are how-to guides for particular information technology analysis, modeling, design or management processes.

14. The method of claim 8, wherein at least some of the discrete informational elements are illustrative examples of particular aspects of information technology analysis, modeling, design and management.

15. The method of claim 8, wherein creating the non-customized knowledge base includes incorporating discrete informational element types that include at least two types selected from the following group: playbooks, documents, toolkits, templates, how-to guides and illustrative examples.

16. The method of claim 15, wherein creating the non-customized knowledge base includes incorporating discrete informational element types that include at least three types selected from the following group: playbooks, documents, toolkits, templates, how-to guides and illustrative examples.

17. The method of claim 16, wherein creating the non-customized knowledge base includes incorporating discrete informational element types that include at least four types selected from the following group: playbooks, documents, toolkits, templates, how-to guides and illustrative examples.

18. The method of claim 1, wherein the high-level framework is implemented by arranging the tree, including at least some of the data connection points thereon, to correspond with an information technology program life cycle.

19. A non-transitory computer-readable medium containing a program for executing a method for providing a library platform, customized for use by a particular customer, of informational elements that each pertain to one or more of information technology analysis, modeling, design and management, the method comprising the following steps:

(a) storing, in a database, a collection of discrete informational elements that each incorporate intellectual property describing an aspect of information technology analysis, modeling, design and/or management, the informational elements collectively forming a non-customized knowledge base, wherein information technology includes at least one element selected from the group comprising computer equipment, computer systems, computer processes, and computer infrastructure which support business activities within a company or other organization;

(b) maintaining a high-level framework in which a plurality of the discrete informational elements may be arranged;

(c) presenting an unpopulated data tree, having data connection points established according to the high-level framework, to a first user via a user interface implemented on a computer;

(d) in conjunction with presentation of the unpopulated data tree, presenting the informational elements of the knowledge base to the first user for customized selection and placement thereof on the tree, wherein selection and placement is based on characteristics, known to the first user, about an information technology system of a particular customer;

(e) in response to selection of a particular informational element, by the first user, from the knowledge base, attaching the selected informational element at a data connection point on the tree, thereby forming a tree node, such that the high-level framework provides semantic context for the selected informational element;

(f) presenting the updated tree to the first user;

(g) iteratively repeating steps (d), (e) and (f) until a library platform, comprising a fully-populated tree that is customized for use by the particular customer, is completed; and (h) producing one or more output files, whose content represents the completed library platform, for use by the particular customer for use in one or more of designing, analysis, modeling and managing the information technology system of the customer, wherein the completed library platform includes a blueprint comprising a reference architecture and design pattern which define functionality and represent business requirements, wherein the blueprint enables an information technology transformation of the information technology by providing tailored transformation information.

20. A system for providing a library platform, customized for use by a particular customer, of informational elements that each pertain to one or more of information technology analysis, modeling, design and management, comprising:

(a) a database containing a collection of discrete informational elements that each incorporate intellectual property describing an aspect of information technology analysis, modeling, design and/or management;

(b) a computer implementing a first user interface usable to customize a library platform, arranged in the form of a data tree that is segregated according to a high-level framework, for use by a particular customer, wherein the data tree is populated, using the first user interface, by iteratively selecting informational elements from the database and attaching the informational elements to the data tree at connection points such that the high-level framework provides semantic context for the selected informational elements, and wherein selection and attachment is carried out at least in part based on characteristics about an information technology system of the particular customer, wherein information technology includes at least one element selected from the group comprising computer equipment, computer systems, computer processes, and computer infrastructure which support business activities within a company or other organization; and (c) a computer implementing a second user interface usable to view the customized library platform, in the form of the fully-populated data tree, such that the data tree provides semantic context to a user, designated by the customer, for the informational elements attached thereto, wherein the completed library platform includes a blueprint comprising a reference architecture and design pattern which define functionality and represent business requirements, wherein the blueprint enables an information technology transformation of the information technology by providing tailored transformation information.

* * * * *